(12) United States Patent
Henshaw et al.

(10) Patent No.: US 12,485,621 B2
(45) Date of Patent: Dec. 2, 2025

(54) METHODS OF ADDITIVELY MANUFACTURING A MANUFACTURED COMPONENT AND SYSTEMS THAT PERFORM THE METHODS

(71) Applicant: The Boeing Company, Chicago, IL (US)

(72) Inventors: Dana Alexander Henshaw, Seattle, WA (US); Eric M. Chapman, Bonney Lake, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/895,792

(22) Filed: Aug. 25, 2022

(65) Prior Publication Data
US 2024/0066803 A1   Feb. 29, 2024

(51) Int. Cl.
*B29C 64/00* (2017.01)
*B22F 10/28* (2021.01)
(Continued)

(52) U.S. Cl.
CPC ............ *B29C 64/393* (2017.08); *B22F 10/28* (2021.01); *B22F 10/85* (2021.01); *B29C 64/153* (2017.08);
(Continued)

(58) Field of Classification Search
None
See application file for complete search history.

(56) References Cited

U.S. PATENT DOCUMENTS 3,600,272 A   8/1971 Cortigene et al.
3,813,976 A   6/1974 Greer
(Continued)

FOREIGN PATENT DOCUMENTS

CN   103817937 A   5/2014
CN   105531062 A   4/2016
(Continued)

OTHER PUBLICATIONS

Lostado Lorza, R., Escribano García, R., Fernandez Martinez, R. and Martínez Calvo, M.Á., 2018. Using genetic algorithms with multi-objective optimization to adjust finite element models of welded joints. Metals, 8(4), p. 230. (Year: 2018).*

(Continued)

*Primary Examiner* — Nicholas R Krasnow
(74) *Attorney, Agent, or Firm* — Kolitch Romano Dascenzo Gates LLC

(57) ABSTRACT

Methods of additively manufacturing a manufactured component and systems that perform the methods. The methods include determining an energy application parameter at an addition location on a previously formed portion of the manufactured component. The energy application parameter includes an intersection area relationship that describes an area of intersection between the previously formed portion and a surface of a virtual geometric shape, which is positioned at the addition location, as a function of a size parameter of the virtual geometric shape. The methods also include supplying a feedstock material to the addition location. The methods further include delivering an amount of energy sufficient to form a melt pool of the feedstock material at the addition location. The amount of energy is based, at least in part, on the energy application parameter. The methods also include consolidating the melt pool with (Continued)

a previously formed portion of the manufactured component.

20 Claims, 12 Drawing Sheets

(51) Int. Cl.
- *B22F 10/85* (2021.01)
- *B29C 64/153* (2017.01)
- *B29C 64/393* (2017.01)
- *B33Y 10/00* (2015.01)
- *B33Y 30/00* (2015.01)
- *B33Y 50/02* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 3,873,399 A | 3/1975 | Goldsworthy et al. |
| 3,993,726 A | 11/1976 | Moyer |
| 4,154,634 A | 5/1979 | Shobert et al. |
| 4,378,343 A | 3/1983 | Sugiura et al. |
| 4,435,246 A | 3/1984 | Green |
| 4,462,946 A | 7/1984 | Goldsworthy |
| 4,799,985 A | 1/1989 | McMahon et al. |
| 4,929,402 A | 5/1990 | Hull |
| 4,943,472 A | 7/1990 | Dyksterhouse et al. |
| 4,973,503 A | 11/1990 | Hotchkiss |
| 5,134,569 A | 7/1992 | Masters |
| 5,204,124 A | 4/1993 | Secretan et al. |
| 5,294,461 A | 3/1994 | Ishida |
| 5,340,433 A | 8/1994 | Crump |
| 5,398,193 A | 3/1995 | deAngelis |
| 5,495,328 A | 2/1996 | Spence et al. |
| 5,503,785 A | 4/1996 | Crump et al. |
| 5,914,080 A | 6/1999 | Gauchel et al. |
| 6,129,872 A | 10/2000 | Jang |
| 6,149,856 A | 11/2000 | Zemel et al. |
| 6,214,279 B1 | 4/2001 | Yang et al. |
| 6,395,210 B1 | 5/2002 | Head et al. |
| 6,495,091 B1 | 12/2002 | Manson et al. |
| 6,500,370 B1 | 12/2002 | Belvin et al. |
| 6,537,052 B1 | 3/2003 | Adler |
| 6,722,872 B1 | 4/2004 | Swanson et al. |
| 6,899,777 B2 | 5/2005 | Vaidyanathan et al. |
| 7,114,943 B1 | 10/2006 | Fong et al. |
| 7,232,850 B2 | 6/2007 | Johnson et al. |
| 7,329,379 B2 | 2/2008 | Boyd et al. |
| 7,521,105 B2 | 4/2009 | Bech et al. |
| 7,681,615 B2 | 3/2010 | McCowin |
| 7,744,801 B2 | 6/2010 | Owada |
| 7,879,177 B2 | 2/2011 | McCowin et al. |
| 7,891,964 B2 | 2/2011 | Skubic et al. |
| 7,942,987 B2 | 5/2011 | Crump et al. |
| 7,960,024 B2 | 6/2011 | Nair et al. |
| 8,110,135 B2 | 2/2012 | El-Siblani |
| 8,133,537 B2 | 3/2012 | Nair et al. |
| 8,151,854 B2 | 4/2012 | Oldani |
| 8,691,037 B2 | 4/2014 | Ingram, Jr. et al. |
| 8,801,990 B2 | 8/2014 | Mikulak et al. |
| 8,920,697 B2 | 12/2014 | Mikulak et al. |
| 9,096,000 B2 | 8/2015 | Maliszewski et al. |
| 9,102,098 B2 | 8/2015 | Dilworth et al. |
| 9,102,099 B1 | 8/2015 | Karpas et al. |
| 9,126,367 B1 | 9/2015 | Mark et al. |
| 9,132,587 B2 | 9/2015 | Eshed et al. |
| 9,138,940 B2 | 9/2015 | Post et al. |
| 9,149,988 B2 | 10/2015 | Mark et al. |
| 9,149,989 B2 | 10/2015 | Uckelmann |
| 9,511,543 B2 | 12/2016 | Tyler |
| 9,527,240 B2 | 12/2016 | Batchelder |
| 9,577,224 B2 | 2/2017 | Lee et al. |
| 9,586,298 B2 | 3/2017 | Jones et al. |
| 9,623,437 B2 | 4/2017 | Tibor et al. |
| 9,650,537 B2 | 5/2017 | Kunc et al. |
| 9,656,641 B2 | 5/2017 | Griffith et al. |
| 9,694,544 B2 | 7/2017 | Mark et al. |
| 9,751,260 B2 | 9/2017 | Dietrich et al. |
| 9,789,462 B2 | 10/2017 | Singh |
| 9,815,268 B2 | 11/2017 | Mark et al. |
| 9,849,019 B2 | 12/2017 | Miller et al. |
| 10,016,932 B2 | 7/2018 | Moore et al. |
| 10,039,195 B2 | 7/2018 | Elmieh et al. |
| 10,137,500 B2 | 11/2018 | Blackmore |
| 10,155,345 B2 | 12/2018 | Ermoshkin et al. |
| 10,195,784 B2 | 2/2019 | Evans et al. |
| 10,201,941 B2 | 2/2019 | Evans et al. |
| 10,232,550 B2 | 3/2019 | Evans et al. |
| 10,232,570 B2 | 3/2019 | Evans et al. |
| 10,293,591 B2 | 5/2019 | Nielsen-Cole et al. |
| 10,335,856 B2 | 7/2019 | Swaminathan et al. |
| 10,343,330 B2 | 7/2019 | Evans et al. |
| 10,343,355 B2 | 7/2019 | Evans et al. |
| 10,442,118 B2 | 10/2019 | Grewell |
| 10,457,033 B2 | 10/2019 | Wilenski et al. |
| 11,073,824 B1 | 7/2021 | Chapman et al. |
| 2001/0048184 A1 | 12/2001 | Ueno |
| 2002/0017743 A1 | 2/2002 | Priedeman, Jr. |
| 2002/0117485 A1 | 8/2002 | Jones et al. |
| 2004/0119188 A1 | 6/2004 | Lowe |
| 2005/0023719 A1 | 2/2005 | Nielsen et al. |
| 2005/0038222 A1 | 2/2005 | Joshi et al. |
| 2005/0093208 A1 | 5/2005 | Boyd et al. |
| 2005/0104241 A1 | 5/2005 | Kritchman et al. |
| 2005/0116391 A1 | 6/2005 | Lindemann et al. |
| 2006/0048881 A1 | 3/2006 | Evans et al. |
| 2007/0029030 A1 | 2/2007 | McCowin |
| 2007/0122560 A1 | 5/2007 | Adams |
| 2008/0157437 A1 | 7/2008 | Nelson et al. |
| 2008/0257879 A1 | 10/2008 | Huskamp |
| 2008/0315462 A1 | 12/2008 | Batzinger et al. |
| 2010/0018953 A1 | 1/2010 | Shapovalov et al. |
| 2011/0195237 A1 | 8/2011 | Patel et al. |
| 2011/0300301 A1 | 12/2011 | Fernando et al. |
| 2012/0267345 A1 | 10/2012 | Clark et al. |
| 2013/0300035 A1 | 11/2013 | Snis |
| 2014/0141166 A1 | 5/2014 | Rodgers |
| 2014/0232035 A1 | 8/2014 | Bheda |
| 2014/0265000 A1 | 9/2014 | Magnotta et al. |
| 2014/0265035 A1 | 9/2014 | Buser et al. |
| 2014/0271328 A1 | 9/2014 | Burris et al. |
| 2014/0291886 A1 | 10/2014 | Mark et al. |
| 2015/0174824 A1 | 6/2015 | Gifford et al. |
| 2015/0239046 A1 | 8/2015 | McMahan et al. |
| 2015/0268040 A1 | 9/2015 | Izumi |
| 2015/0314532 A1 | 11/2015 | Gordon |
| 2016/0041111 A1 | 2/2016 | Beuth et al. |
| 2016/0059352 A1 | 3/2016 | Sparks |
| 2016/0059493 A1* | 3/2016 | Sparks .................. B22F 10/25 700/98 |
| 2016/0096326 A1 | 4/2016 | Naware |
| 2016/0114532 A1 | 4/2016 | Schirtzinger et al. |
| 2016/0159009 A1 | 6/2016 | Canale |
| 2016/0207259 A1 | 7/2016 | Fruth |
| 2016/0230283 A1 | 8/2016 | Tseliakhovich et al. |
| 2016/0236299 A1 | 8/2016 | Oberhofer |
| 2016/0271874 A1 | 9/2016 | Tsai et al. |
| 2016/0326880 A1 | 11/2016 | Slavens et al. |
| 2017/0014906 A1 | 1/2017 | Ng et al. |
| 2017/0072633 A1 | 3/2017 | Hsu |
| 2017/0120538 A1 | 5/2017 | DeMuth et al. |
| 2017/0129179 A1 | 5/2017 | Mandel et al. |
| 2017/0129180 A1* | 5/2017 | Coates .............. B23Q 11/0046 |
| 2017/0136545 A1 | 5/2017 | Yoshimura et al. |
| 2017/0157845 A1 | 6/2017 | Bihari et al. |
| 2017/0157857 A1 | 6/2017 | Butcher et al. |
| 2017/0217100 A1 | 8/2017 | Gardiner |
| 2017/0235294 A1 | 8/2017 | Shapiro et al. |
| 2017/0239884 A1 | 8/2017 | Batchelder et al. |
| 2017/0282246 A1 | 10/2017 | Liebl et al. |

(56) References Cited

U.S. PATENT DOCUMENTS

| | | | |
|---|---|---|---|
| 2017/0341307 | A1 | 11/2017 | Vilajosana et al. |
| 2018/0029127 | A1 | 2/2018 | Ng et al. |
| 2018/0029296 | A1 | 2/2018 | Van Esbroeck et al. |
| 2018/0072000 | A1 | 3/2018 | Riemann |
| 2018/0117836 | A1 | 5/2018 | Reese et al. |
| 2018/0120260 | A1 | 5/2018 | Goldfine et al. |
| 2018/0126671 | A1 | 5/2018 | Wilenski et al. |
| 2018/0141284 | A1 | 5/2018 | Wilenski et al. |
| 2018/0154588 | A1 | 6/2018 | Wilenski et al. |
| 2018/0193918 | A1 | 7/2018 | Griffith et al. |
| 2018/0236714 | A1 | 8/2018 | Thelakkadan et al. |
| 2018/0333962 | A1 | 11/2018 | Greggio |
| 2018/0345597 | A1 | 12/2018 | Wilenski et al. |
| 2018/0361660 | A1 | 12/2018 | Chen |
| 2019/0009462 | A1 | 1/2019 | Wilenski et al. |
| 2019/0009471 | A1 | 1/2019 | Wilenski et al. |
| 2019/0054701 | A1 | 2/2019 | Yoshinari |
| 2019/0210287 | A1 | 7/2019 | Newell |
| 2019/0389137 | A1 | 12/2019 | Forhnmaier et al. |
| 2020/0130056 | A1 | 4/2020 | Geisen |
| 2020/0147868 | A1 | 5/2020 | Gold |
| 2020/0156322 | A1 | 5/2020 | Yorozu |
| 2020/0176251 | A1 | 6/2020 | Cook et al. |
| 2020/0242495 | A1* | 7/2020 | Roychowdhury ...... B22F 10/36 |
| 2021/0001561 | A1 | 1/2021 | Hamann et al. |
| 2021/0055710 | A1 | 2/2021 | Borish et al. |
| 2021/0146613 | A1 | 5/2021 | Hyatt et al. |
| 2021/0170682 | A1 | 6/2021 | Cooper et al. |
| 2021/0260701 | A1 | 8/2021 | Nelson et al. |
| 2021/0268586 | A1* | 9/2021 | Takeshita ............. B22F 10/322 |
| 2021/0299754 | A1 | 9/2021 | Aoyagi et al. |
| 2021/0323089 | A1 | 10/2021 | Chapman et al. |
| 2021/0323090 | A1 | 10/2021 | Chapman et al. |
| 2021/0323091 | A1 | 10/2021 | Chapman et al. |
| 2021/0396689 | A1 | 12/2021 | Lavens et al. |
| 2022/0032368 | A1 | 2/2022 | O'Neill et al. |
| 2022/0203281 | A1 | 6/2022 | Maskrot et al. |
| 2023/0042159 | A1 | 2/2023 | Chern et al. |
| 2023/0051719 | A1 | 2/2023 | Shuck |
| 2023/0066289 | A1 | 3/2023 | He et al. |
| 2023/0390865 | A1 | 12/2023 | Sumi et al. |

FOREIGN PATENT DOCUMENTS

| | | | |
|---|---|---|---|
| CN | 105209240 | B | 6/2017 |
| DE | 102013103973 | A1 | 10/2014 |
| DE | 102015002967 | A1 | 10/2016 |
| DE | 102019132191 | A1 | 5/2021 |
| EP | 1151849 | A1 | 11/2001 |
| EP | 1494248 | A2 | 1/2005 |
| EP | 2583773 | A2 | 4/2013 |
| EP | 3127635 | A1 | 2/2017 |
| EP | 3804883 | A1 | 4/2021 |
| JP | H02130132 | A | 5/1990 |
| JP | 2015174284 | A | 10/2015 |
| WO | WO2001081031 | A1 | 11/2001 |
| WO | WO2006020685 | A2 | 2/2006 |
| WO | WO2008013483 | A1 | 1/2008 |
| WO | WO2012039956 | A1 | 3/2012 |
| WO | WO2013086577 | A1 | 6/2013 |
| WO | WO2014138386 | A1 | 9/2014 |
| WO | WO2014153535 | A3 | 12/2014 |
| WO | WO2015009938 | A1 | 1/2015 |
| WO | WO2015193819 | A2 | 12/2015 |
| WO | WO2016053681 | A1 | 4/2016 |
| WO | WO2016125138 | A2 | 8/2016 |
| WO | WO2016139059 | A1 | 9/2016 |
| WO | WO2016149181 | A1 | 9/2016 |
| WO | WO2022180673 | A1 | 9/2022 |

OTHER PUBLICATIONS

Machine generated English translation of CN 103817937A, Espacenet.com on Mar. 26, 2018.

Machine-generated English translation of CN105209240B, downloaded from Google Patents on Aug. 24, 2022.

Machine-generated English translation of CN105531062A, downloaded from Google Patents on Dec. 22, 2020.

Machine generated English translation of abstract for DE201310103973A1 downloaded from Espacenet.com on Nov. 1, 2017.

Machine generated English translation of the abstract of DE102015002967A1, downloaded from Espacenet.com Jun. 12, 2018.

Machine generated English translation of abstract for EP1494248A2 downloaded from Espacenet.com on Nov. 21, 2018.

Machine-generated English translation of JPH02130132A, downloaded from Espacenet on Mar. 11, 2020.

Machine generated English translation of the abstract of JP2015174284A, downloaded from Espacenet.com Jun. 12, 2018.

Ogale et al., "Fabrication of Fiber Reinforced Plates with Curvilinear Layout by 3 D Photolithography," 26th International SAMPE Technical Conference, vol. 26, pp. 54-61, Oct. 17-20, 1994.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Ogale et al., "3-Dimensional Composite Photolithography," Proceedings of the American Society for Composites, Eleventh Technical Conference, pp. 822-828, Oct. 7-9, 1996.

Gupta et al., "Dual Curing of Carbon Fiber Reinforced Photoresins for Rapid Prototyping," Polymer Composites, vol. 23, No. 6, pp. 1162-1170, Dec. 2002.

Hu et al., "Sensing, Modeling and Control for Laser-Based Additive Manufacturing," International Journal of Machine Tools and Manufacture, No. 43, pp. 51-60, 2003.

Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.

Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.

Printout of online article "Carbon3D Introduces Breakthrough Clip Technology for Layerless 3D Printing, 25-100x Faster," Mar. 17, 2015, from 3Ders.org website, downloaded on Aug. 19, 2015.

Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.

Website screenshots showing "Fiber Composite 3D Printing," from MakeZine.com website, downloaded on Jun. 2, 2015.

Farshidianfar et al., "Real-Time Control of Microstructure in Laser Additive Manufacturing," International Journal of Advanced Manufacturing Technology (2016), vol. 82, pp. 1173-1186, published online Jul. 1, 2015.

Website screenshots showing the Mark One Composite 3D Printer, from MarkForged.com website, downloaded on Aug. 19, 2015.

Printout of online article "Automated Fiber Placement," from AutomatedDynamics.com website, downloaded on Aug. 19, 2015.

Printout of website showing FormLabs, Frequently Asked Questions (re the Form1+ SLA 3D Printer), from FormLabs.com website, downloaded on Aug. 19, 2015.

User Manual for 3Doodler 2.0, from The3Doodler.com website, downloaded on Aug. 19, 2015.

Website screenshots of online how-to article, "Fiber Composite 3D Printing (The Bug)," from Instructables.com website, downloaded on Aug. 20, 2015.

Website screenshots showing the Form 1+ SLA 3D Printer, from FormLabs.com website, downloaded on Aug. 20, 2015.

Printout of online article, Jeff Sloan, "Arevo Labs launches 3D printing platform for composite parts fabrication," Nov. 16, 2015, from CompositesWorld.com website, downloaded on Dec. 9, 2015.

Website screenshots of online article, Evan Milberg, "Arevo Labs Introduces First Robot-Based Platform for 3-D Printing Composite

(56) References Cited

OTHER PUBLICATIONS

Parts," Nov. 23, 2015, from Composites ManufacturingMagazine.com website, downloaded on Jan. 12, 2016.
Printout of online article, "Improving Additive Manufacturing (3D Printing) using Infrared Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.
Sinha, S. and Meisel, N. (2018), "Influence of process interruption on mechanical properties of material extrusion parts", Rapid Prototyping Journal, vol. 24 No. 5, pp. 821-827.
European Patent Office, Extended European Search Report for related European patent application EP 23 20 3013 (Mar. 15, 2024).
European Patent Office, Extended European Search Report for related European patent application EP 23 20 3015 (Mar. 15, 2024).
European Patent Office, Extended European Search Report for related European patent application EP 23 20 3016 (Mar. 15, 2024).
Wang et al., "Research on the Fabricating Quality Optimization of the Overhanging Surface in SLM Process," 65 International Journal of Advanced Manufacturing Technology 9-12, pp. 1471-1484 (Jun. 16, 2012).
Kruth et al., "Feedback Control of Selective Laser Melting," 3rd International Conference on Advanced Research in Virtual and Rapid Prototyping, pp. 521-527 (Sep. 1, 2007), https://lirias.kuleuven.be/bitstream/123456789/185342/1/krufcs.pdf.
Senthilkumaran et al., "Influence of Building Strategies on the Accuracy of Parts in Selective Laser Sintering," 30 Materials and Design 8, pp. 2946-2954 (2009).
Viale et al., "Optimisation of Downskin Parameters to Produce Metallic Parts via Laser Powder Bed Fusion Process: An Overview," 123 International Journal of Advanced Manufacturing Technology pp. 2159-2182 (Nov. 2, 2022), https://doi.Org/10.1007/S00170-022-10314-z.
Machine-generated English language translation for DE102019132191A1 (May 27, 2021).
Machine-generated English language translation for WO2022180673A1 (Sep. 1, 2022).
Senthilkumaran et al., "Influence of building strategies on the accuracy of parts in selective laser sintering," Materials & Design, vol. 30, Is. 20, pp. 2946-2954, (2009).

\* cited by examiner

METHODS OF ADDITIVELY MANUFACTURING A MANUFACTURED COMPONENT AND SYSTEMS THAT PERFORM THE METHODS

FIELD

The present disclosure relates generally to methods of additively manufacturing a manufactured component, to systems that perform the methods, and/or to storage media that direct systems to perform the methods.

BACKGROUND

Additive manufacturing processes generally utilize a form of energy input to consolidate a feedstock material into a manufactured component. In such additive manufacturing processes, an amount of energy needed to consolidate the feedstock material may vary with location within the manufactured component. As such, too much energy may be applied in some areas and/or too little energy may be applied in other areas, which may produce non-uniformities within the manufactured component. Thus, there exists a need for improved methods of additively manufacturing a manufactured component and/or for improved systems that perform the methods.

SUMMARY

Methods of additively manufacturing a manufactured component and systems that perform the methods are disclosed herein. The methods include determining an energy application parameter at an addition location on a previously formed portion of the manufactured component. The energy application parameter includes an intersection area relationship that describes an area of intersection between the previously formed portion of the manufactured component and a surface of a virtual geometric shape, which is positioned at the addition location, as a function of a size parameter of the virtual geometric shape. The methods also include supplying a feedstock material to the addition location. The methods further include delivering, from an energy source and to the addition location, an amount of energy sufficient to form a melt pool of the feedstock material at the addition location. The amount of energy is based, at least in part, on the energy application parameter. The methods also include consolidating the melt pool with a previously formed portion of the manufactured component to form an additional portion of the manufactured component.

The systems include a support platform, which is configured to support the manufactured component during additive manufacture of the manufactured component. The systems also include a feedstock supply system, which is configured to supply the feedstock material to the addition location of the manufactured component. The systems further include an energy source, which is configured to deliver the amount of energy to the addition location. The systems also include a controller, which is programmed to control the operation of the systems according to the methods.

DESCRIPTION

Figure 1:
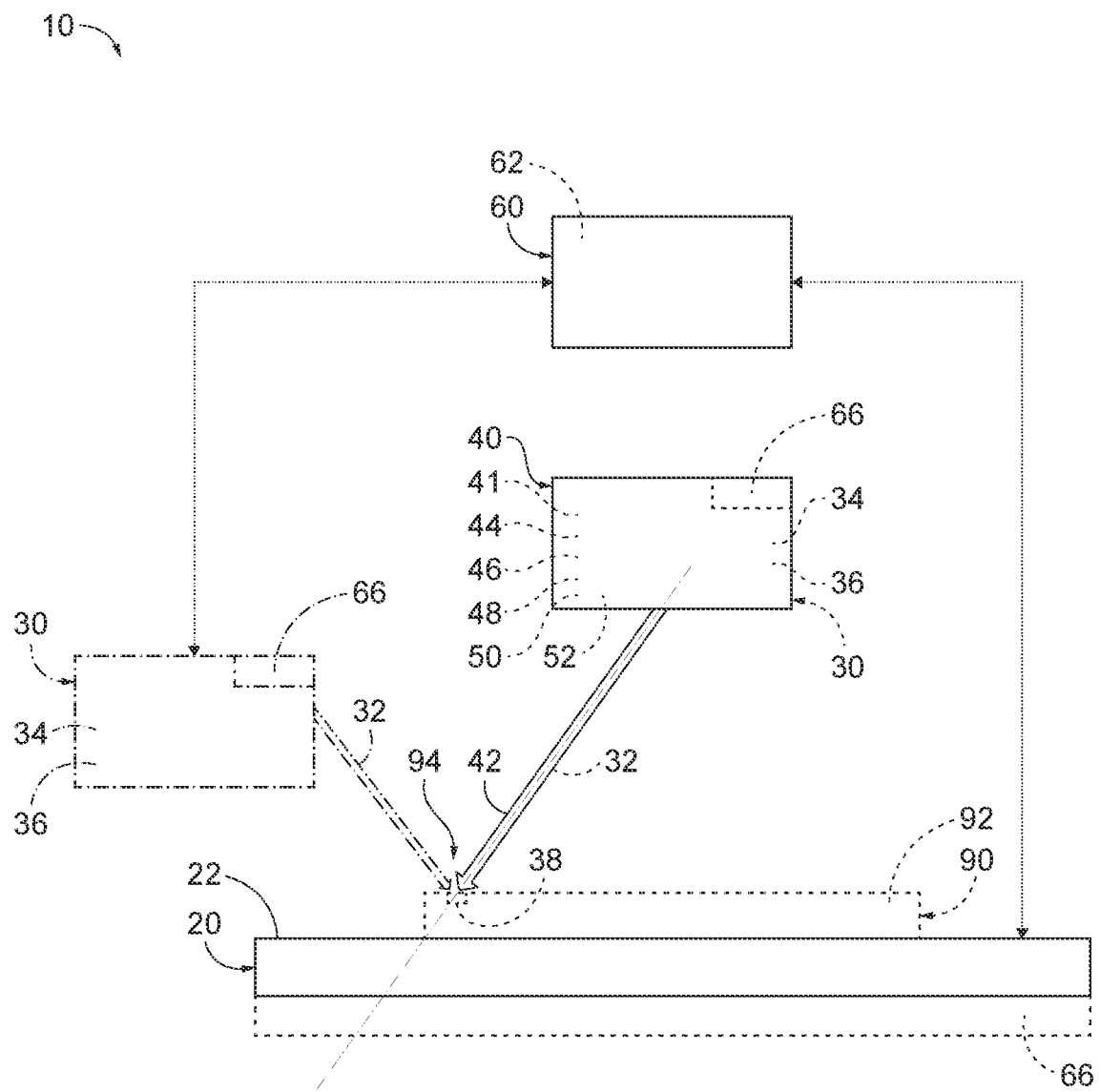
FIG. 1 is a schematic illustration of examples of additive manufacturing systems, according to the present disclosure.

FIGS. 1-22 provide illustrative, non-exclusive examples of additive manufacturing systems and/or of methods 100, according to the present disclosure. Elements that serve a similar, or at least substantially similar, purpose are labeled with like numbers in each of FIGS. 1-22, and these elements may not be discussed in detail herein with reference to each of FIGS. 1-22. Similarly, all elements may not be labeled in each of FIGS. 1-22, but reference numerals associated therewith may be utilized herein for consistency. Elements, components, and/or features that are discussed herein with reference to one or more of FIGS. 1-22 may be included in and/or utilized with any of FIGS. 1-22 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of examples of additive manufacturing systems 10, according to the present disclosure. Additive manufacturing systems 10 may be configured to additively manufacture a manufactured component 90. As illustrated in FIG. 1, additive manufacturing systems 10 include a support platform 20, a feedstock supply system 30, and energy source 40, and a controller 60. Support platform 20 may be configured to support manufactured component 90 during additive manufacture of the manufactured component. Stated differently, support platform 20 may be configured to support manufactured component 90 during an additive manufacturing process that manufactures manufactured component 90. Example of support platform 20 include a build plate and/or another structure that is configured to provide physical support for manufactured component 90. In some examples, support platform 20 may include and/or define a support surface 22 upon which manufactured component 90 may be supported, formed, and/or defined during the additive manufacturing process.

Feedstock supply system 30 may be configured to supply a feedstock material 32 to an addition location 94 of manufactured component 90. Examples of feedstock supply system 30 include a powder supply system 34, which is configured to supply feedstock material 32 in the form of a feedstock material powder, and/or a filament supply system 36, which is configured to supply feedstock material 32 in the form of a feedstock material filament.

Energy source 40 may be configured to deliver an amount of energy 42 to addition location 94. Examples of energy source 40 include an electrical power source 44, a source of electromagnetic radiation 46, a laser beam source 48, an electron beam source 50, and/or a heat source 52. In some examples of additive manufacturing systems 10, and as illustrated in dashed lines in FIG. 1, energy source 40 may be configured to provide amount of energy 42 to addition location 94 in and/or within feedstock material 32. Examples of such additive manufacturing systems 10 include wire feed directed energy deposition, fused deposition modeling, wire arc additive manufacturing, directed energy deposition, and/or powder feed directed energy deposition. In some examples of additive manufacturing systems 10, and as illustrated in dash-dot lines in FIG. 1, energy source may be configured to provide amount of energy 42 to addition location 94 separately from feedstock material 32. Examples of such additive manufacturing systems 10 include laser powder bed fusion and/or electron beam powder bed fusion. In such examples, energy source 40 also may be referred to herein as and/or may include an energy delivery mechanism 41.

As illustrated in dashed lines in FIG. 1, systems 10 may include an actuation assembly 66. Actuation assembly 66, when present, may be adapted, configured, designed, and/or constructed to move support platform 20, to move at least one component of feedstock supply system 30, and/or to move at least one component of energy source 40, such as to permit and/or to facilitate motion of addition location 94 relative to support surface 22 of support platform 20. As an example, actuation assembly 66 may be associated with support platform 20 and/or may be configured to move support platform 20 relative to both feedstock supply system 30 and energy source 40. As another example, actuation assembly 66 may be associated with feedstock supply system 30 and/or may be configured to cause feedstock supply system 30 to vary a location at which feedstock material 32 approaches and/or contacts previously formed portion 92. As yet another example, actuation assembly 66 may be associated with energy source 40 and/or may be configured to cause energy source 40 to vary a location at which amount of energy 42 approaches and/or is incident upon previously formed portion 92. Examples of actuation assembly 66 include any suitable electric actuator, mechanical actuator, hydraulic actuator, pneumatic actuator, linear actuator, rotary actuator, servo motor, stepper motor, rack and pinion assembly lead screw assembly, ball screw assembly, and/or piezoelectric actuator.

Controller 60 is programmed to control the operation of at least one other component of additive manufacturing system 10. This may include controlling the operation of the at least one other component according to and/or by performing any suitable step and/or steps of methods 100, which are discussed in more detail herein. Controller 60 may include and/or be any suitable structure, device, and/or devices that may be adapted, configured, designed, constructed, and/or programmed to perform the functions discussed herein. As examples, controller 60 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media 62. This non-transitory computer readable storage media 62 may include, define, house, and/or store computer-executable instructions, programs, and/or code; and these computer-executable instructions may direct additive manufacturing systems 10 and/or controller 60 thereof to perform any suitable portion, or subset, of methods 100. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

During operation of additive manufacturing systems 10, energy source 40 may provide amount of energy 42 to addition location 94. Concurrently and/or previously, depending upon the specific additive manufacturing process that is utilized, feedstock supply system 30 may provide feedstock material 32 to addition location 94. Amount of energy 42 may be absorbed by feedstock material 32 at addition location 94, which may soften and/or melt feedstock material 32, forming a melt pool 38 at addition location 94. This process may be repeated, with amount of energy 42 being supplied at addition locations 94 where manufactured component 90 is to be formed, or where feedstock material 32 is to be added to a previously formed portion 92 of manufactured component 90, to form, define, and/or complete manufactured component 90.

Figure 2:
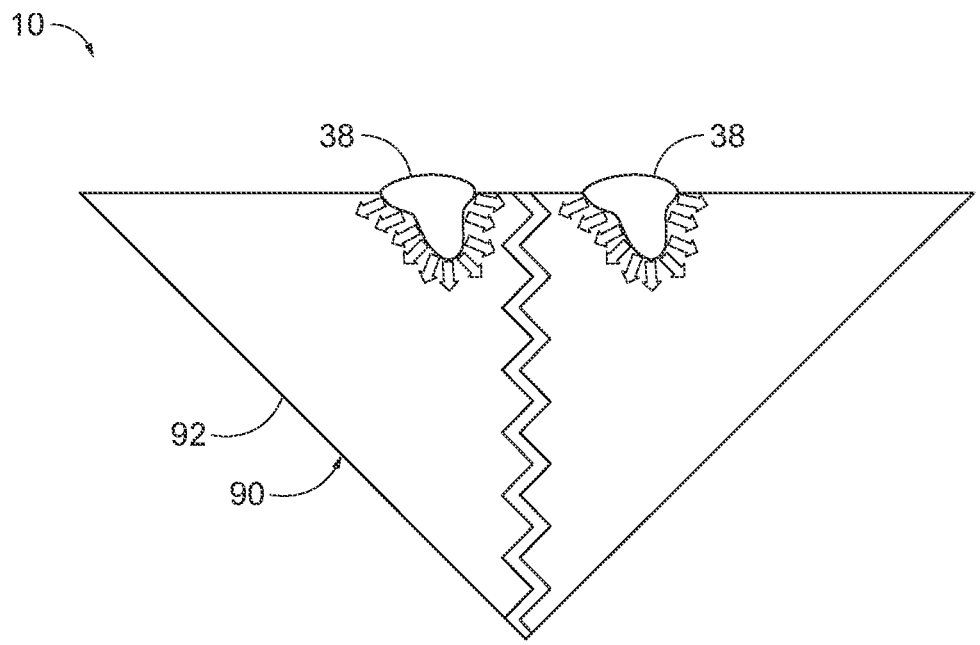
FIG. 2 is a schematic illustration of examples of additive manufacturing of a manufactured component, according to the present disclosure.
Figure 3:
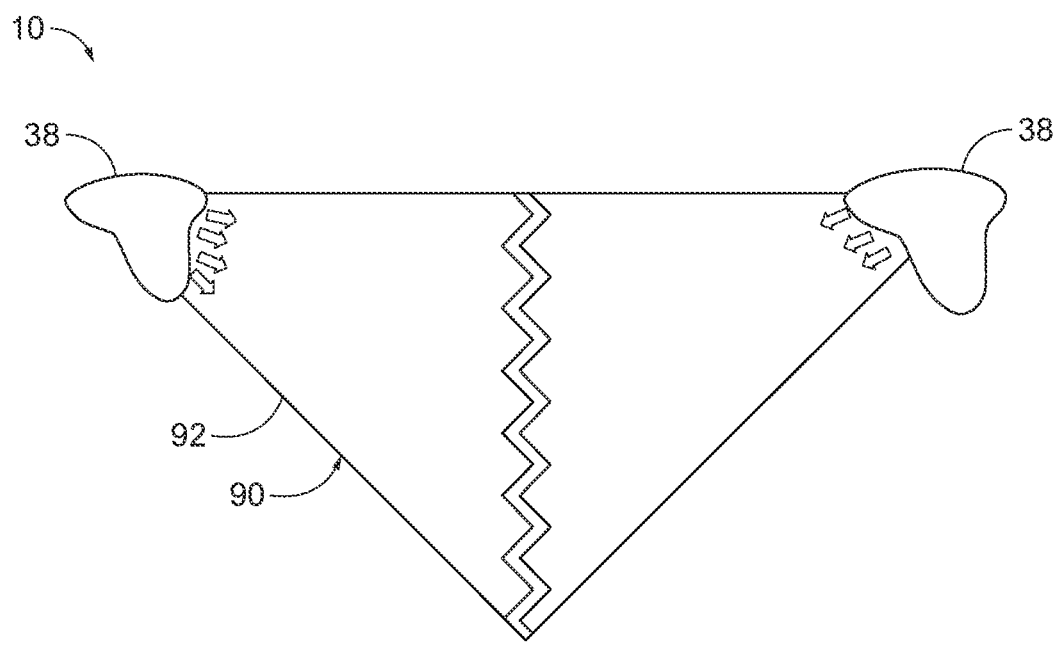
FIG. 3 is a schematic illustration of examples of additive manufacturing of a manufactured component, according to the present disclosure.

Turning to FIGS. 2-3, a size of melt pool 38 that may be generated by a given amount of energy 42 may vary with position within previously formed portion 92 of manufactured component 90. As an example, thermal conductivity of amount of energy 42 away from melt pool 38 may be greater within an interior region of previously formed portion 92, as illustrated in FIG. 2, when compared with an edge region of previously formed portion 92, as illustrated in FIG. 3. This may cause melt pool 38 to be relatively smaller within the interior region when compared to the edge region. This variation in the size of melt pool 38 may cause one or more properties of manufactured component 90 to vary between the interior region and the edge region. This variation may be undesirable and/or may cause defects within manufactured component 90. With this in mind, and as discussed in more detail herein, methods 100 may control, regulate, and/or vary amount of energy 42, such as to decrease the variation in the size of melt pool 38 and/or to decrease variation in the one or more properties of manufactured component 90.

Figure 4:
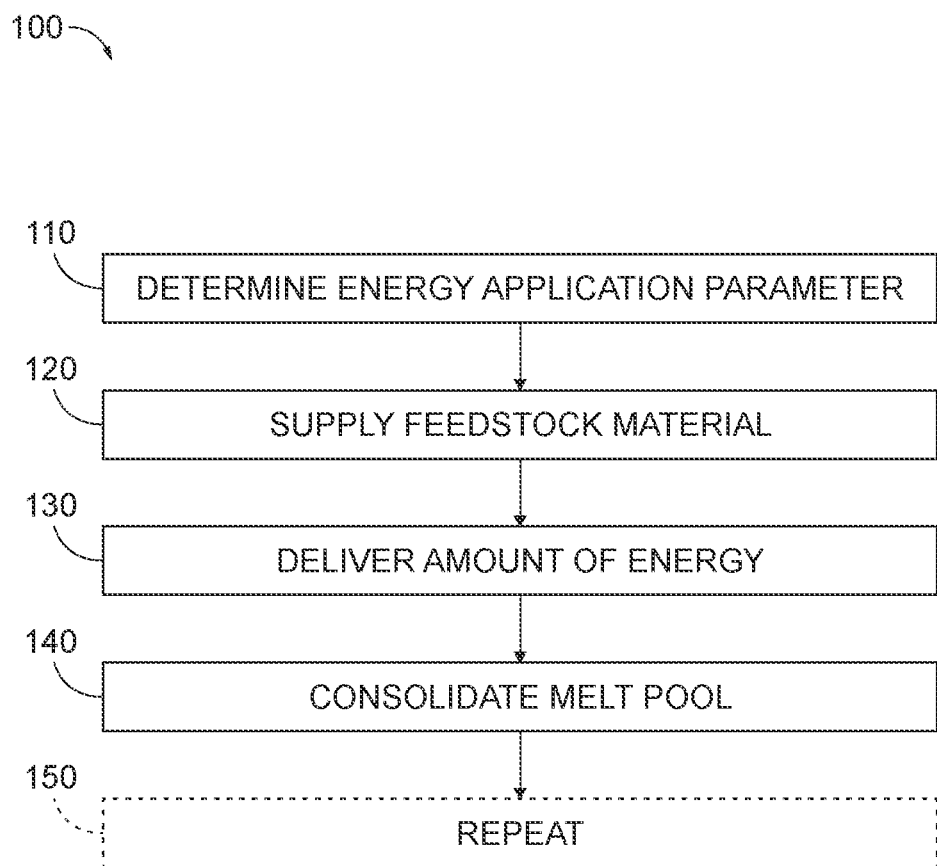
FIG. 4 is a flowchart depicting examples of methods of additively manufacturing a manufactured component, according to the present disclosure.

FIG. 4 is a flowchart depicting examples of methods 100 of additively manufacturing a manufactured component, according to the present disclosure. Methods 100 include determining an energy application parameter at 110 and supplying a feedstock material at 120. Methods 100 also include delivering an amount of energy at 130 and consolidating a melt pool at 140. Methods 100 further may include repeating at 150.

Determining the energy application parameter at 110 may include determining, establishing, and/or calculating the energy application parameter at an addition location on a previously formed portion of the manufactured component. Stated differently, the energy application parameter, a value of the energy application parameter, and/or a magnitude of the energy application parameter may be location-specific, may be specific to a given addition location, may vary with location, and/or may vary for different addition locations on the previously formed portion of the manufactured component. Examples of the addition location are disclosed herein with reference to addition location 94. Examples of the previously formed portion of the manufactured component are disclosed herein with reference to previously formed portion 92 of manufactured component 90.

The determining at 110 may be performed in any suitable manner. As an example, the determining at 110 may include determining the energy application parameter based, at least in part, on a rate of thermal energy dissipation at the addition location and/or within the previously formed portion of the manufactured component. Stated differently, with reference to FIGS. 2-3, and as discussed in more detail herein, the rate of thermal energy dissipation, at the addition location, may vary with the geometry of the previously formed portion of the manufactured component and/or with the position of the addition location within the previously formed portion of the manufactured component. The energy application parameter may be utilized to account and/or to adjust for this variation, thereby permitting and/or facilitating more well-regulated control of melt pool size and/or of the material properties of the manufactured component.

As another example, the determining at 110 may include determining the energy application parameter based, at least in part, on an angle of incidence between the application location and the amount of energy. Stated differently, and as discussed in more detail herein, changes in the angle of incidence may cause the amount of energy to be absorbed and/or dissipated differently at different addition locations on the previously formed portion of the manufactured component. The energy application parameter may be utilized to account and/or to adjust for this variation, once again permitting and/or facilitating more well-regulated control of melt pool size and/or of the material properties of the manufactured component.

As yet another example, the determining at 110 may include determining the energy application parameter based, at least in part, on an efficiency of absorption of the amount of energy by the previously formed portion of the manufactured component. Stated differently, and as discussed in more detail herein, changes in the geometry and/or materials of the previously formed portion of the manufactured component may cause the amount of energy to be absorbed and/or dissipated differently, or with different efficiencies, at different addition locations on the previously formed portion of the manufactured component. The energy application parameter may be utilized to account and/or to adjust for this variation, once again permitting and/or facilitating more well-regulated control of melt pool size and/or of the material properties of the manufactured component.

As another example, the determining at 110 may include determining the energy application parameter based, at least in part, on a direction of absorption of the amount of energy by the previously formed portion of the manufactured component. Stated differently, and as discussed in more detail herein, the direction of absorption of the amount of energy, within the previously formed portion of the manufactured component, may cause the amount of energy to be absorbed and/or dissipated differently at different addition locations on the previously formed portion of the manufactured component. The energy application parameter may be utilized to account and/or to adjust for this variation, once again permitting and/or facilitating more well-regulated control of melt pool size and/or of the material properties of the manufactured component.

As yet another example, the determining at 110 may include determining the energy application parameter based, at least in part, on a material property of the feedstock material. Examples of the material property of the feedstock material include a latent heat of fusion of the feedstock material, a thermal conductivity of the feedstock material, and/or a melting point of the feedstock material. In some such examples, such as when methods 100 are performed within additive manufacturing systems in which bulk feedstock material is in thermal contact with the previously formed portion of the manufactured component, these material properties may have a significant impact on the size of a melt pool that is generated by a given amount of energy. The energy application parameter may be utilized to account and/or to adjust for this thermal contact, once again permitting and/or facilitating more well-regulated control of melt pool size and/or of the material properties of the manufactured component.

As another example, the determining at 110 may include determining the energy application parameter based, at least in part, on a material property of the previously formed portion of the manufactured component. Examples of the material property of the previously formed portion of the manufactured component include a latent heat of fusion of the previously formed portion of the manufactured component, a thermal conductivity of the previously formed portion of the manufactured component, and/or a melting point of the previously formed portion of the manufactured component. Energy dissipation within the previously formed portion of the manufactured component may be significantly impacted by these material properties and thereby may have a significant impact on the size of a melt pool that is generated by a given amount of energy. The energy application parameter may be utilized to account and/or to adjust for this energy dissipation, once again permitting and/or facilitating more well-regulated control of melt pool size and/or of the material properties of the manufactured component.

As yet another example, the determining at 110 may include determining the energy application parameter based, at least in part, on a shape of the previously formed portion of the manufactured component. The shape of the previously formed portion of the manufactured component may impact a contact area between the melt pool and a remainder of the previously formed portion of the manufactured component and/or may impact an ability of the previously formed portion of the manufactured component to dissipate energy from the melt pool.

As another example, the determining at 110 may include determining the energy application parameter based, at least in part, on a temperature of the previously formed portion of the manufactured component. The temperature, or the current temperature, of the previously formed portion of the manufactured component, may impact a driving force for energy dissipation from the melt pool and/or into the previously formed portion of the manufactured component. As a more specific example, a temperature differential between a melt pool temperature of the melt pool and the temperature of the previously formed portion of the manufactured component may impact a rate at which thermal energy is dissipated via conduction within the previously formed portion of the manufactured component. The energy application parameter may be utilized to account and/or to adjust for this variation in energy dissipation, once again permitting and/or facilitating more well-regulated control of melt pool size and/or of the material properties of the manufactured component.

As yet another example, the determining at 110 may include determining the energy application parameter based, at least in part, on an environmental factor of and/or within an environment that surrounds the melt pool and/or the previously formed portion of the manufactured component. Examples of the environmental property include a material property of an environmental gas within the environment surrounding the previously formed portion of the manufactured component and/or a material property of a support platform that supports the previously formed portion of the manufactured component. The environmental factor may impact energy dissipation from the melt pool, such as energy dissipation into the environmental gas and/or into the support platform. The energy application parameter may be utilized to account and/or to adjust for this variation in energy dissipation, once again permitting and/or facilitating more well-regulated control of melt pool size and/or of the material properties of the manufactured component.

Supplying the feedstock material at 120 may include supplying the feedstock material to the addition location. This may include supplying the feedstock material with, via, and/or utilizing a feedstock supply system. Examples of the feedstock material are disclosed herein with reference to feedstock material 32. Examples of the feedstock supply system are disclosed herein with reference to feedstock supply system 30.

The supplying at 120 may be accomplished in any suitable manner. As an example, the supplying at 120 may include supplying a powder feedstock material. Examples of the powder feedstock material include a metallic powder feedstock material, a polymeric powder feedstock material, and/or a composite powder feedstock material. As another example, the supplying at 120 may include supplying a feedstock material filament. Examples of the feedstock material filament include a wire, an electrically conductive filament, a metallic filament, a polymeric filament, and/or a composite filament.

In some examples, the supplying at 120 may include distributing a layer of the feedstock material, or of the powder feedstock material, on a surface, or on an exposed upper surface, of the previously formed portion of the manufactured component. In some such examples, the supplying at 120 may be performed prior to the delivering at 130. Stated differently, and in some such examples, the layer of the feedstock material may be distributed on the surface of the previously formed portion of the manufactured component prior to delivery of the amount of energy to the addition location.

In some examples, the supplying at 120 may be performed concurrently and/or cooperatively with the delivering at 130. In some such examples, the supplying at 120 may permit and/or facilitate the delivering at 130. Stated differently, and in some such examples, the delivering at 130 may include delivering the amount of energy in, within, and/or via the feedstock material. Additionally or alternatively, and in some such examples, the delivering at 130 may include delivering the amount of energy via an energy delivery mechanism that is separate and/or distinct from the feedstock material.

More specific examples of additive manufacturing processes that may be utilized with methods 100 are discussed below. The described additive manufacturing processes are included herein as illustrative, non-exclusive examples of additive manufacturing processes, according to the present disclosure, and it is within the scope of the present disclosure that methods 100 may be utilized to control other additive manufacturing processes in addition to and/or instead of those described herein.

An example of additive manufacturing processes that may utilize methods 100 includes powder bed fusion processes, such as laser powder bed fusion and/or electron beam powder bed fusion. In such powder bed fusion processes, the feedstock material includes the powdered feedstock material, and the supplying at 120 includes distributing the layer of the powdered feedstock material on the surface of the previously formed portion of the manufactured component. This is performed prior to the delivering at 130. Also in such powder bed fusion processes, the addition location is defined on the surface of the previously formed portion of the manufactured component, and the delivering at 130 includes delivering the amount of energy to the addition location separately from distribution of the powdered feedstock material. As examples, the delivering at 130 may include delivering the amount of energy in the form of a laser beam that is directed incident upon the addition location and/or in the form of an electron beam that is directed incident upon the addition location.

Another example of additive manufacturing processes that may utilize methods 100 include powder feed processes, such as powder feed directed energy deposition and/or other powder-based directed energy deposition processes. In such powder feed processes, the feedstock material includes the powdered feedstock material, and the supplying at 120 includes flowing the powdered feedstock material to the addition location as a feedstock material stream. This is performed concurrently with the delivering at 130.

Yet another example of additive manufacturing processes that may utilize methods 100 include filament, or wire, feed processes, such as wire feed directed energy deposition, fused deposition modeling, wire arc additive manufacturing, and/or other filament-based directed energy deposition processes. In such filament feed processes, the feedstock material includes the feedstock material filament, the supplying at 120 includes conveying the feedstock material filament to the addition location, and/or the delivering at 130 may be performed concurrently with the supplying at 120. In some such filament feed processes, the delivering at 130 may include delivering the amount of energy via the feedstock material filament, such as by heating the feedstock material filament prior to delivery to the addition location and/or generating a voltage differential between the feedstock material filament and the addition location. Additionally or alternatively, and in some such filament feed processes, the delivering at 130 may include delivering the amount of energy via the energy delivery mechanism that is distinct from the feedstock material, such as by directing a laser, an electron beam, and/or an electric arc incident upon the addition location.

Delivering the amount of energy at 130 may include delivering the amount of energy from an energy source. The amount of energy may be sufficient to form a melt pool of the feedstock material at the addition location and may be based, at least in part, on the energy application parameter. Stated differently, a magnitude of the amount of energy may be selected and/or delivered based, at least in part, on the energy application parameter, on a value of the energy application parameter, and/or on a magnitude of the energy application parameter. Examples of the energy source are disclosed herein with reference to energy source 40. Examples of the melt pool are disclosed herein with reference to melt pool 38. Examples of the amount of energy include an amount of electric energy, an amount of photon energy, an amount of electron beam energy, and/or an amount of heat. The amount of energy generally may be quantified in units of energy, such as Joules and/or electron volts.

In some examples, the delivering at 130 may include delivering such that the amount of energy is proportional, directly proportional, and/or linearly proportional to the energy application parameter, or to the magnitude of the energy application parameter. In some examples, the delivering at 130 may include delivering such that the amount of energy increases with an increase in the energy application parameter, or with an increase in the magnitude of the energy application parameter. In some examples, the delivering at 130 may include delivering such that the amount of energy decreases with a decrease in the energy application parameter, or with a decrease in the magnitude of the energy application parameter.

In some examples, the delivering at 130 may include selectively varying the amount of energy based, at least in part, on the energy application parameter and/or on variation in the energy application parameter. The selectively varying may be accomplished in any suitable manner. As examples, the selectively varying may include selectively varying a power consumption of the energy source, an intensity of energy incident upon the addition location, an exposure time of energy incident upon the addition location, and/or an application area over which the energy is incident upon the addition location (e.g., a size and/or area of the addition location).

Consolidating the melt pool at 140 may include consolidating the melt pool with the previously formed portion of the manufactured component. This may include consolidating to form and/or to define an additional portion of the manufactured component. Stated differently, and upon consolidation of the melt pool, feedstock material, which is contained within the melt pool, may fuse to, may add to, and/or may become a portion of the previously formed portion of the manufactured component, thereby increasing a size and/or volume of the previously formed portion of the manufactured component.

The consolidating at 140 may be accomplished in any suitable manner. As an example, the consolidating at 140 may include solidifying the melt pool. As another example, the consolidating at 140 may include cooling the melt pool to below a melting temperature of the feedstock material. As yet another example, the consolidating at 140 may include fusing the feedstock material, from the melt pool, to the previously formed portion of the manufactured component.

Repeating at 150 may include repeating any suitable step and/or steps of methods 100 in any suitable manner and/or for any suitable purpose. As an example, the repeating at 150 may include repeating at least the determining at 110, the delivering at 120, and the consolidating 140 a plurality of times at a plurality of, or at a plurality of different, addition locations to fully define the manufactured component. This may include selecting the amount of energy at each addition location of the plurality of addition locations based, at least in part, on a corresponding energy application parameter at each location. Stated differently, the amount of energy may vary from one addition location to another addition location, with this variation being based, at least in part, on a variation in corresponding energy application parameter from the one addition location to the other addition location.

The selecting the amount of energy may be performed in any suitable manner. As an example, the selecting the amount of energy may include increasing the amount of energy at a given addition location of the plurality of addition locations, relative to another addition location of the plurality of addition locations, responsive to an increase in the corresponding energy application parameter at the given addition location relative to the other addition location. As another example, the selecting the amount of energy may include increasing the amount of energy at the given addition location, relative to the other addition location, responsive to a decrease in the corresponding energy application parameter at the given addition location relative to the other addition location. As yet another example, the selecting the amount of energy may include decreasing the amount of energy at the given addition location, relative to the other addition location, responsive to a decrease in the corresponding energy application parameter at the given addition location relative to the other addition location. As another example, the selecting the amount of energy may include decreasing the amount of energy at the given addition location, relative to the other addition location, responsive to an increase in the corresponding energy application parameter at the given addition location relative to the other addition location.

In some examples, and for a given addition location of the plurality of addition locations, the repeating at 150 also may include adjusting the amount of energy based, at least in part, on an already delivered amount of energy that already has been delivered to the previously formed portion of the manufactured component. As a more specific example, and during the repeating at 150, the corresponding amount of energy may be provided to the plurality of addition locations. This may cause energy, or heat, to build up within the previously formed portion of the manufactured component, with this energy, or heat, build up increasing with time during formation of the manufactured component. With this in mind, adjusting may, for example, include decreasing the amount of energy, which would be provided to a given addition location based solely upon the energy application parameter, to account, or to adjust, for the energy, or heat, build up. This adjustment may further fine-tune the amount of energy provided to the given addition location, thereby further improving control of melt pool size and/or of material properties of the manufactured component.

As another example, the addition location may include and/or be a first addition location, the energy application parameter may include and/or be a first energy application parameter, the amount of energy may include and/or be a first amount of energy, the melt pool may include and/or be a first melt pool, and the additional portion of the manufactured component may include and/or be a second additional portion of the manufactured component. In this example, the repeating at 150 may include repeating the determining at 110 to determine a second energy application parameter at a second addition location on the previously formed portion of the manufactured component. Also in this example, the repeating at 150 may include supplying the feedstock material to the second addition location. In some such examples, such as when the supplying at 120 is performed concurrently with the delivering at 130, this may include repeating the supplying at 120. In other such examples, such as when the supplying at 120 is performed prior to the delivering at 130, the supplying the feedstock material to the second addition location may have been performed during supply of the feedstock material to the first addition location.

Also in this example, the repeating at 150 may include repeating the delivering at 130 to deliver, from the energy source and to the second addition location, a second amount of energy sufficient to form a second melt pool of the feedstock material at the second addition location. In this example, the second amount of energy is based, at least in part, on the second energy application parameter. Also in this example, the repeating at 150 may include repeating the consolidating at 140 to consolidate the second melt pool with the previously formed portion of the manufactured component. This may include consolidating to form and/or define a second additional portion of the manufactured component.

In such examples, the second energy application parameter may differ from the first energy application parameter. Additionally or alternatively, and in such examples, the second amount of energy may differ from the first amount of energy. This difference between the second amount of energy and the first amount of energy may be based, at least in part, on the difference between the second energy application parameter and the first energy application parameter.

In such examples, a first melt pool size of the first melt pool may be equal, or at least substantially equal, to a second melt pool size of the second melt pool. Additionally or alternatively, a first melt pool shape of the first melt pool may be equal, or at least substantially equal, to a second melt pool shape of the second melt pool. Stated differently, the difference between the second amount of energy and the first amount of energy may be specifically selected, determined, and/or calculated, via the difference between the second energy application parameter and the first energy application parameter, to provide a constant, or at least substantially constant, melt pool size and/or melt pool shape during the repeating at 150. Examples of the first melt pool size and/or of the second melt pool size include a volume, a maximum dimension, a diameter, and/or a characteristic dimension of the first melt pool and/or of the second melt pool.

In some examples, the determining the first energy application parameter and the determining the second energy application parameter may include determining such that the second melt pool is within a threshold melt pool size range of the first melt pool. Examples of the threshold melt pool size range include at least 80%, at least 85%, at least 90%, at least 95%, at least 97.5%, at least 99%, at most 120%, at most 115%, at most 110%, at most 105%, at most 102.5%, and/or at most 101% of the first melt pool size.

In some examples, the determining the first energy application parameter and the determining the second energy application parameter may include determining such that a second penetration depth of the second melt pool into the previously formed portion of the manufactured component is within a threshold penetration depth range of a first penetration depth of the first melt pool into the previously formed portion of the manufactured component. Examples of the threshold penetration depth range include at least 80%, at least 85%, at least 90%, at least 95%, at least 97.5%, at least 99%, at most 120%, at most 115%, at most 110%, at most 105%, at most 102.5%, and/or at most 101% of the first penetration depth.

The following discussions represent more specific versions of methods 100. These more specific versions of methods 100 determine more specific energy application parameters, during the determining at 110, and the amount of energy delivered, during the delivering at 130, is based, at least in part, on these more specific energy application parameters.

In a first example, the energy application parameter includes, is, or instead is an overlap volume between a virtual geometric shape and the previously formed portion of the manufactured component. The overlap volume also may be referred to herein as a volume of intersection and/or as an overlap volume between the virtual geometric shape and the previously formed portion of the manufactured component.

Figure 5:
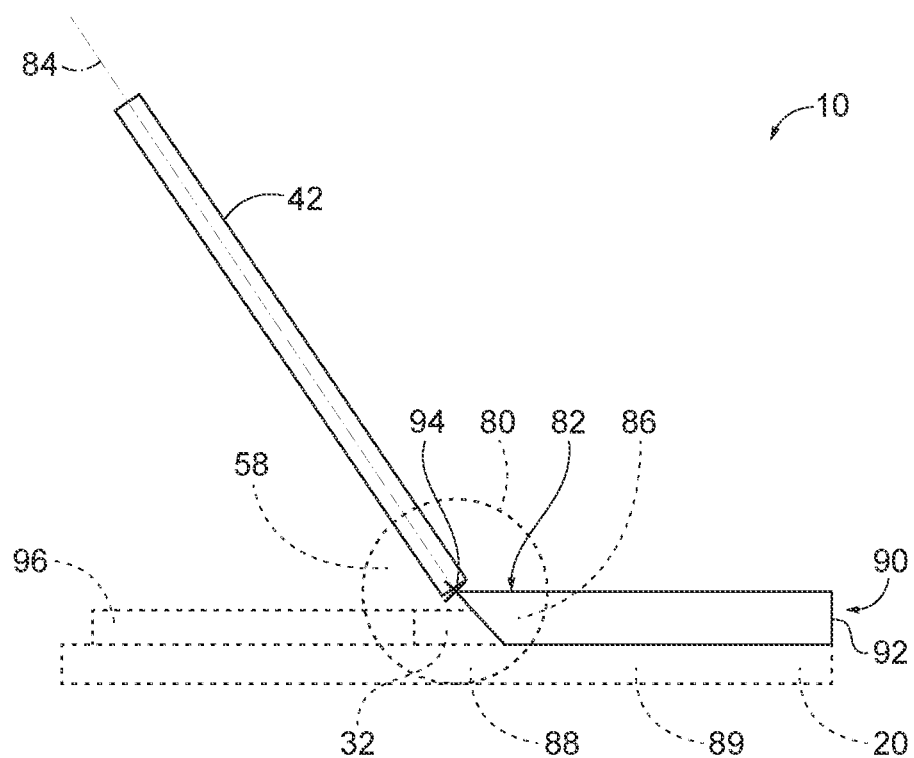
FIG. 5 is a schematic illustration of an example of an overlap volume that may be utilized with methods, according to the present disclosure.

An example of the virtual geometric shape is illustrated in FIG. 5 and indicated at 80. In FIG. 5, amount of energy 42 is being delivered to addition location 94, and the centroid of virtual geometric shape 80 is positioned at addition location 94. FIG. 5 also illustrates an overlap volume 82 between virtual geometric shape 80 and previously formed portion 92 of manufactured component 90.

Figure 6:
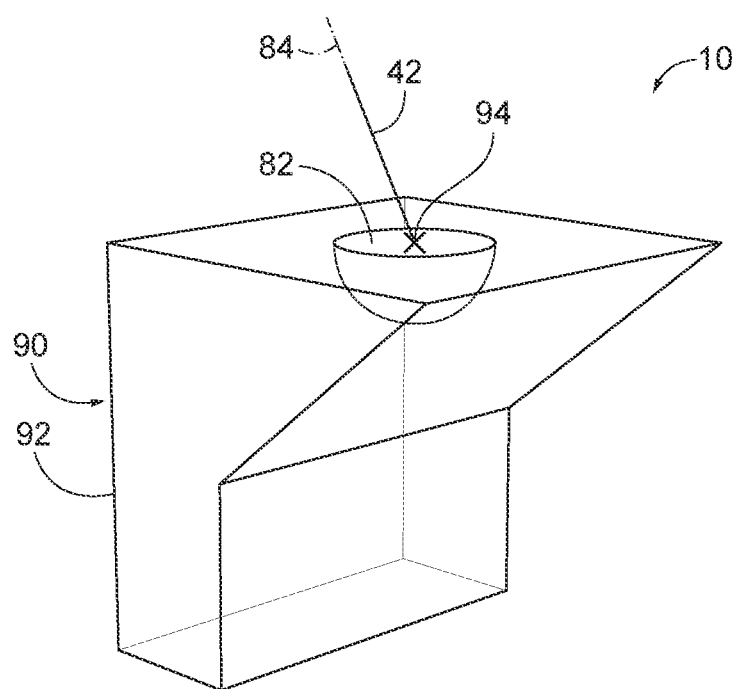
FIG. 6 is a schematic illustration of an example of an overlap volume that may be utilized with methods, according to the present disclosure.
Figure 7:
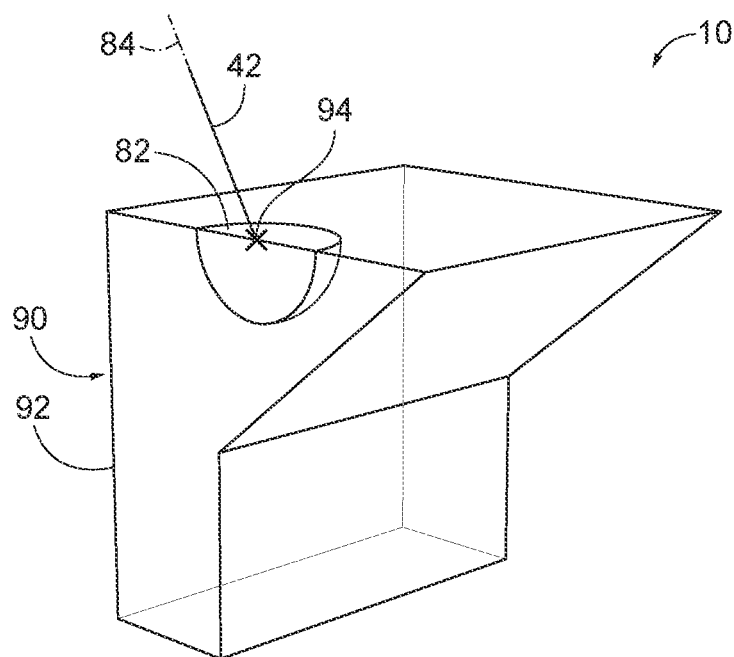
FIG. 7 is a schematic illustration of an example of an overlap volume that may be utilized with methods, according to the present disclosure.
Figure 8:
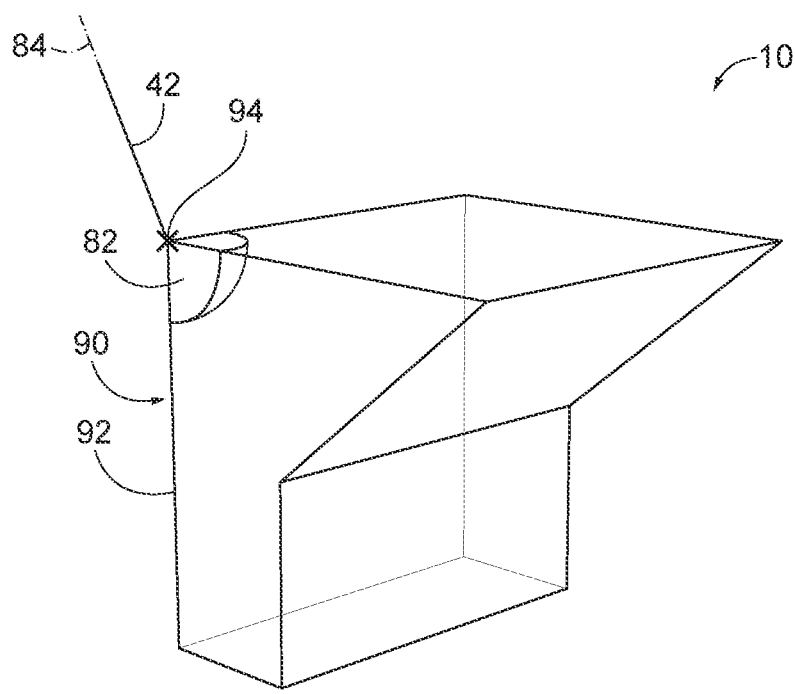
FIG. 8 is a schematic illustration of an example of an overlap volume that may be utilized with methods, according to the present disclosure.

Overlap volume 82 may be indicative of, or proportional to, a volume and/or surface area for energy transfer between addition location 94 and a remainder of previously formed portion 92. As an example, and as illustrated in FIG. 6, conditions in which addition location 94 is centered on an exposed surface of previously formed portion 92 may indicate a maximum value for overlap volume 82 and also may indicate a maximum potential for energy transfer between previously formed portion 92 and addition location 94. However, overlap volume 82 may decrease substantially when addition location 94 is centered on an edge of previously formed portion 92, as illustrated in FIG. 7, and/or on a corner of previously formed portion 92, as illustrated in FIG. 8.

The virtual geometric shape 80 may be positioned at addition location 94. As an example, virtual geometric shape 80 may be centered at the addition location 94 and/or may be centered at a center of the addition location 94. As another example, a centroid of virtual geometric shape 80 may be positioned the addition location 94.

In some examples, the delivering at 130 may include delivering amount of energy 42 along an axis of incidence, an example of which is illustrated in FIGS. 5-8 and indicated at 84. In some such examples, virtual geometric shape 80 may be symmetric, or rotationally symmetric, about axis of incidence 84.

As discussed in more detail herein, examples of virtual geometric shape 80 include a sphere, an ellipsoid, a cylinder, and/or a cone. When the virtual geometric shape is the sphere, overlap volume 82 may be an at least partially spherical overlap volume. When the virtual geometric shape is the ellipsoid, overlap volume 82 may be an at least partially ellipsoidal overlap volume. When the virtual geometric shape is the cylinder, overlap volume 82 may be an at least partially cylindrical overlap volume. When the virtual geometric shape is a cone, overlap volume 82 may be an at least partially conic overlap volume. In some examples, such as when virtual geometric shape 80 is the ellipsoid, the cylinder, and/or the cone, the virtual geometric shape may define an elongate axis. In such examples, the elongate axis may extend along axis of incidence 84.

While, as discussed, a location of the virtual geometric shape may vary with the addition location, the virtual geometric shape may be invariant and/or fixed during methods 100. As examples, the virtual geometric shape may have a fixed and/or a predetermined size, volume, maximum dimension, characteristic dimension, and/or shape during methods 100.

In some examples, virtual geometric shape 80 may have and/or define a virtual geometric shape volume. In such examples, overlap volume 82 may be less than the virtual geometric shape volume. As an example, and as illustrated in FIGS. 5-8, overlap volume 82 may be at most half of the virtual geometric shape volume.

In order to provide a desired level of sensitivity to variations in the overlap volume, the virtual geometric shape may be sized based, at least in part, on a size of manufactured component 90. As an example, the size, volume, maximum dimension, and/or characteristic dimension of the virtual geometric shape may be a threshold size fraction of a corresponding size, volume, maximum dimension, and/or characteristic dimension of the manufactured component. Examples of the threshold size fraction include at least 0.01%, at least 0.05%, at least 0.1%, at least 0.5%, at last 1%, at least 2.5%, at least 5%, at least 10%, at most 25%, at most 20%, at most 15%, at most 10%, at most 5%, at most 2.5%, and/or at most 1%.

In some examples and as discussed, methods 100, or the repeating at 150, may include varying a position of the addition location on the previously formed portion of the manufactured component, such as to form and/or define a plurality of addition locations. This is illustrated in FIGS. 6-8. In some such examples, during the varying, and as also discussed, the repeating at 150 may include repeating at least the determining at 110, the delivering at 130, and the consolidating at 140 a plurality of times at the plurality of addition locations, such as to fully define the manufactured component. In such examples, the repeating the determining at 110 may include determining a corresponding overlap volume at each addition location, and the delivering at 130 may include delivering a corresponding amount of energy at each addition location. The corresponding amount of energy may be based upon and/or may be proportional to the corresponding overlap volume.

In some such examples, and responsive to the corresponding overlap volume at a given addition location decreasing from the corresponding overlap volume at a prior addition location, the repeating the delivering at 140 may include decreasing the corresponding amount of energy delivered at the given addition location relative to the corresponding amount of energy delivered at the prior addition location. This is illustrated, for example, by the transition from addition location 94 that is illustrated in FIG. 6 (e.g., the prior addition location) to addition location 94 that is illustrated in FIG. 7 (e.g., the given addition location). As illustrated, overlap volume 82 decreases substantially from FIG. 6 to FIG. 7, and methods 100 account for this decrease in overlap volume by decreasing amount of energy 42 delivered at addition location 94 of FIG. 7 relative to amount of energy 42 delivered at addition location 94 of FIG. 6.

In some such examples, and responsive to the corresponding overlap volume at the given addition location increasing from the corresponding overlap volume at the prior addition location, the repeating the delivering at 140 may include increasing the corresponding amount of energy delivered at the given addition location relative to the corresponding amount of energy delivered at the prior addition location. This is illustrated, for example, by the transition from addition location 94 that is illustrated in FIG. 7 (e.g., the prior addition location) to addition location 94 that is illustrated in FIG. 6 (e.g., the given addition location). As illustrated, overlap volume 82 increases substantially from FIG. 7 to FIG. 6, and methods 100 account for this increase in overlap volume 82 by increasing amount of energy 42 delivered at addition location 94 of FIG. 6 relative to amount of energy 42 delivered at addition location 94 of FIG. 7.

In some examples, overlap volume 82 may include and/or be a first overlap volume, and overlap volume 82 also may include a second, or additional, overlap volume. The first overlap volume may include overlap between virtual geometric shape 80 and previously formed portion 92 of the manufactured component, and the second, or additional, overlap volume may include overlap between virtual geometric shape 80 and at least one environmental component in an environment that surrounds previously formed portion 92 of manufactured component 90. Examples of the at least one environmental component include a support platform for the previously formed portion of the manufactured component, the feedstock material, and/or environmental gas. Additional examples of the at least one environmental component include a region of the manufactured component and/or of another manufactured component that is discontinuous with, not connected to, or not yet connected to the previously formed portion of the manufactured component.

As illustrated in FIG. 5, virtual geometric shape 80 may overlap both with previously formed portion 92 of manufactured component 90 an also with environmental components 89, such as support platform 20, feedstock material 32, an environmental gas 58, and/or discontinuous regions 96 of manufactured component 90 and/or of another manufactured component. Each of these environmental components may define a corresponding second, or subsequent, overlap volume 88 with virtual geometric shape 80.

Each of these environmental components also may dissipate energy from the addition location; however, an efficiency and/or rate at which these environmental components dissipate energy from the addition location may vary significantly when compared to an efficiency and/or rate at which the previously formed portion of the manufactured component dissipates energy from the addition location.

When the overlap volume includes both the first overlap volume and the second, or subsequent, overlap volume(s), and in some examples, the amount of energy may be based, at least in part, on only the first overlap volume. Stated differently, the amount of energy may be determined based upon overlap between the virtual geometric shape and the environmental components. Alternatively, and in other examples, the amount of energy may be based, at least in part, on both the first overlap volume and the second, or additional, overlap volume(s). In such a configuration, the amount of energy may be weighted differently for the first overlap volume when compared to the second, or additional overlap volume(s).

In a second example, the energy application parameter includes, is, or instead is an intersection area relationship. The intersection area relationship may describe an area of intersection 70 between the previously formed portion of the manufactured component and a surface of the virtual geometric shape as a function of a size parameter of the virtual geometric shape while virtual geometric shape is positioned at the addition location.

Figure 9:
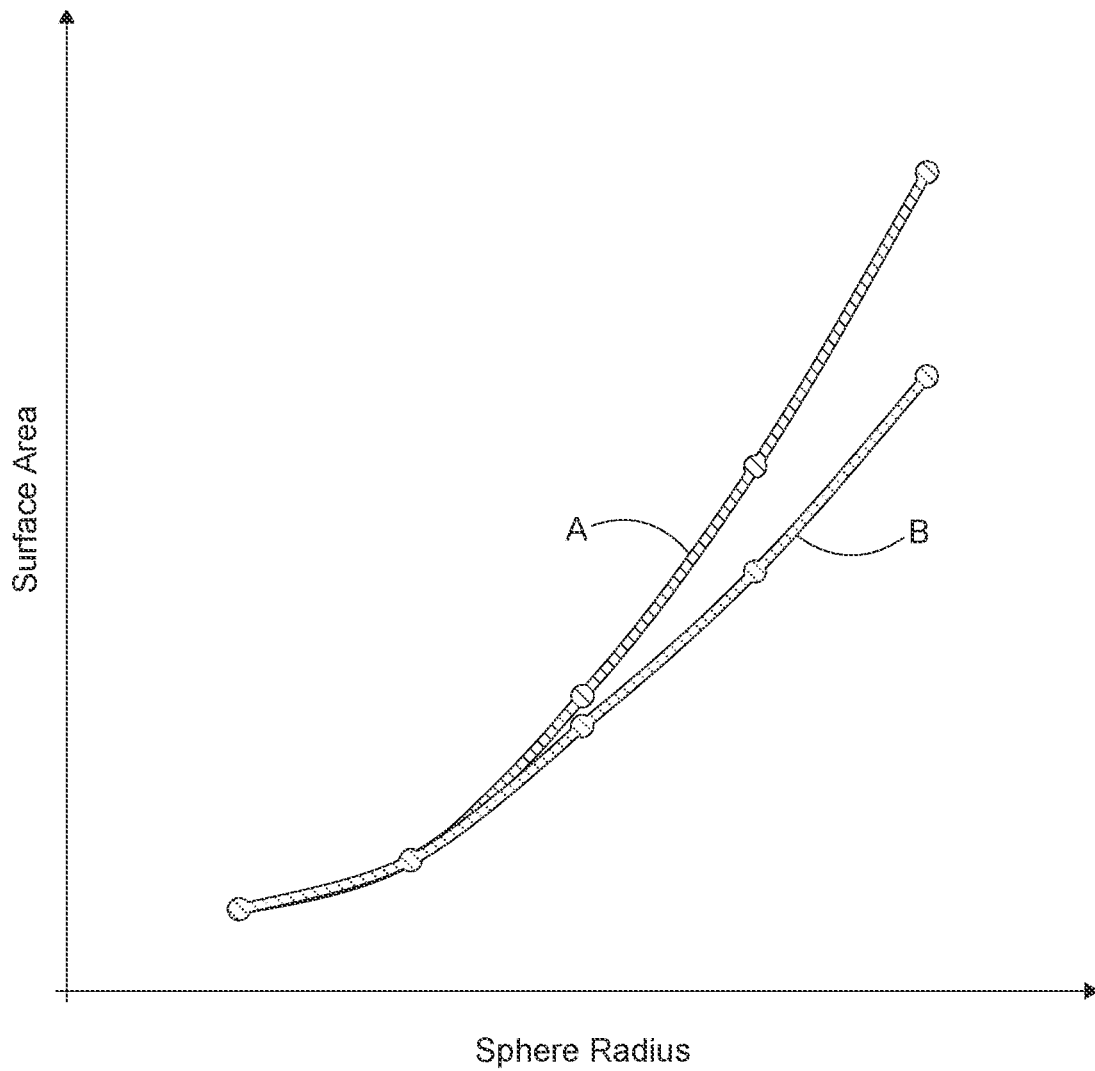
FIG. 9 is an illustration of an intersection relationship that may be utilized with methods, according to the present disclosure.
Figure 10:
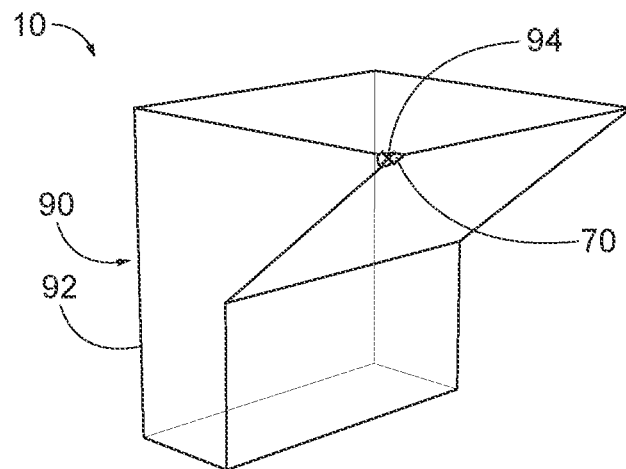
FIG. 10 is a schematic illustration of generation of an intersection relationship that may be utilized with methods, according to the present disclosure.
Figure 11:
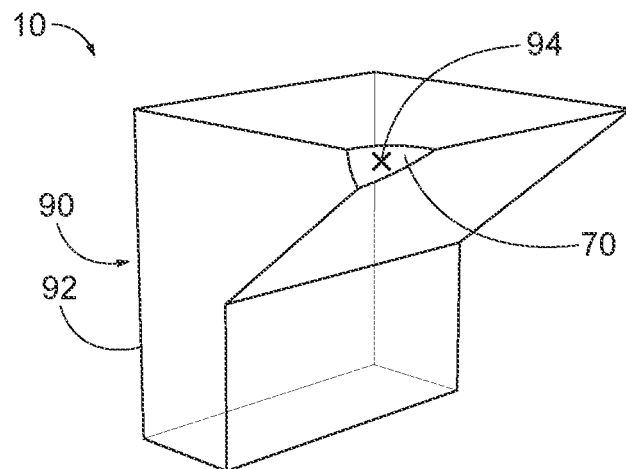
FIG. 11 is a schematic illustration of generation of an intersection relationship that may be utilized with methods, according to the present disclosure.
Figure 12:
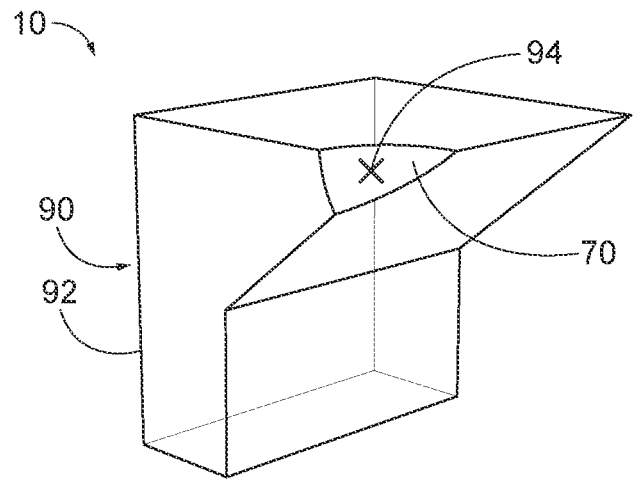
FIG. 12 is a schematic illustration of generation of an intersection relationship that may be utilized with methods, according to the present disclosure.
Figure 13:
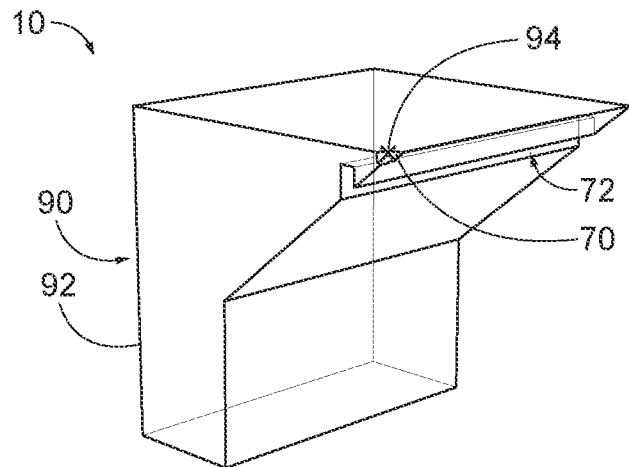
FIG. 13 is a schematic illustration of generation of an intersection relationship that may be utilized with methods, according to the present disclosure.
Figure 14:
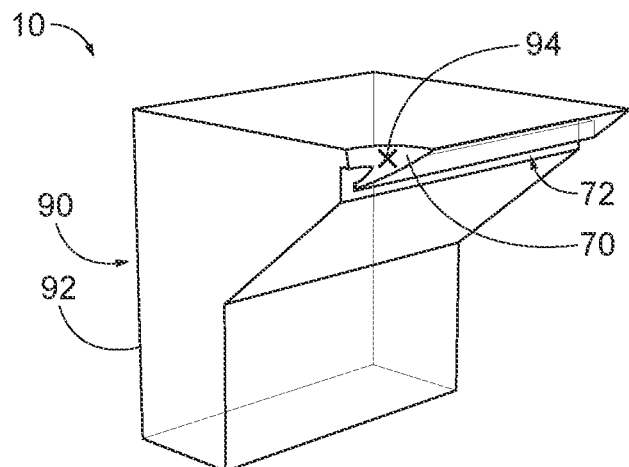
FIG. 14 is a schematic illustration of generation of an intersection relationship that may be utilized with methods, according to the present disclosure.
Figure 15:
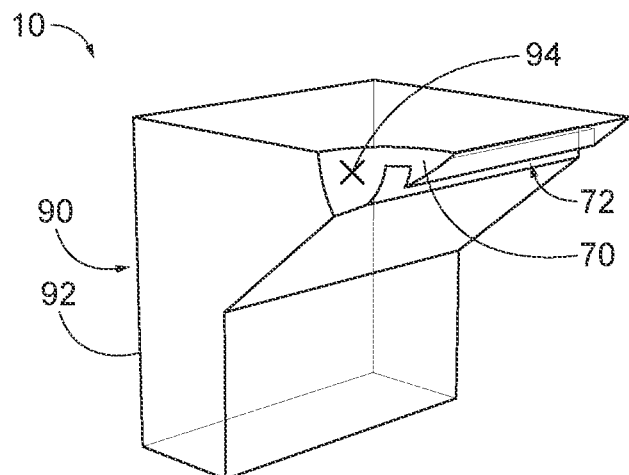
FIG. 15 is a schematic illustration of generation of an intersection relationship that may be utilized with methods, according to the present disclosure.

An example of the intersection area relationship is illustrated in FIG. 9. More specifically, FIG. 9 plots two different intersection area relationships. One, which is indicated at A, is taken from previously formed portion 92 of manufactured component 90 that is illustrated in FIGS. 10-12 and the other, which is indicated at B, is taken from previously formed portion 92 of manufactured component 90 that is illustrated in FIGS. 13-15. Previously formed portion 92 of FIGS. 10-12 differs from previously formed portion 92 of FIGS. 13-15 only in that previously formed portion 92 of FIGS. 13-15 includes a gap 72, a void 72, or an inclusion 72. Gap 72 may function as a thermal conduction bottleneck, such as by causing a decrease in a cross-sectional area for thermal conduction within previously formed portion 92 and/or away from addition location 94. For the intersection area relationships of FIG. 9, addition location 94 is positioned at a projecting corner of previously formed portion 92, and FIG. 9 plots the surface area of intersection between a spherical virtual geometric shape as a function of a radius of the spherical geometric shape.

As may be seen from FIG. 9, when the radius of the virtual geometric shape is small, the intersection area relationship is identical for the two examples. This is illustrated graphically by FIGS. 10 and 13. However, as the radius of the virtual geometric shape is increased, the intersection between the virtual geometric shape and previously formed portion 92 eventually contacts gap 72. The presence of gap 72 causes area of intersection 70 for previously formed portion 92 of FIGS. 13-15 to be less than area of intersection 70 for previously formed portion 92 of FIGS. 10-12.

This decrease in area of intersection 70 may alter, or decrease, the ability of previously formed portion 92 of FIGS. 13-15 to convey energy away from addition location 94 when compared to previously formed portion 92 of FIGS. 10-12. The intersection area relationship illustrated in FIG. 9 quantifies this variation and/or may be utilized by methods 100 to account for the longer-distance ability of a given manufactured component to convey energy away from the addition location, thereby permitting and/or facilitating more accurate control of the size of the melt pool and/or of the material properties of the manufactured component.

While illustrated as a plot in FIG. 9, it is within the scope of the present disclosure that the intersection area relationship may have any suitable form. Examples of the intersection area relationship include a plot of the area of intersection as a function of the size parameter, tabulated values of the area of intersection and corresponding values of the size parameter, and/or a functional relationship between the area of intersection and the size parameter.

The area of intersection may be defined in any suitable manner. As an example, and for a given size parameter of the virtual geometric shape, a corresponding area of intersection may quantify a surface area of an outer surface of the virtual geometric shape that extends within, intersects, and/or contacts the previously formed portion of the manufactured component.

The virtual geometric shape many include and/or be any suitable virtual geometric shape, and examples of the virtual geometric shape are disclosed herein. In this second example, the virtual geometric shape may have a constant, or at least substantially constant, shape and/or proportion. Stated differently, and while the size, or the size parameter, of the virtual geometric shape may be varied, such as to generate the intersection area relationship, the proportions of the virtual geometric shape may be invariant and/or fixed. Stated still differently, the virtual geometric shape defined by one size parameter may be similar, or geometrically similar, to the virtual geometric shape defined by another, or a different, size parameter. However, for a given size parameter, the virtual geometric shape may have and/or define a given virtual geometric shape volume, which corresponds to the given size parameter.

The size parameter may include and/or be any suitable size parameter for the virtual geometric shape. As examples, the size parameter may be indicative of a volume of the virtual geometric shape and/or of a surface area of the virtual geometric shape. As more specific examples, the size parameter may include and/or be a radius of the virtual geometric shape, a diameter of the virtual geometric shape, an effective radius of the virtual geometric shape, an effective diameter of the virtual geometric shape, a circumference of the virtual geometric shape, a volume of the virtual geometric shape, and/or a surface area of the virtual geometric shape.

In some examples of methods 100, the determining at 110 may include generating the intersection area relationship. This may include quantifying the area of intersection between the previously formed portion of the manufactured component and the surface of the virtual geometric shape for a plurality of different size parameters of the virtual geometric shape.

The generating the intersection area relationship may be accomplished in any suitable manner. As an example, the generating the intersection area relationship may include virtually positioning the virtual geometric shape at the addition location, and determining, for a plurality of different size parameters of the virtual geometric shape, a corresponding plurality of areas of intersection between the previously formed portion of the manufactured component and the surface of the virtual geometric shape. In this example, the generating the intersection area relationship further may include producing the intersection area relationship based, at least in part, on the plurality of different size parameters and the corresponding plurality of areas of intersection.

Producing the intersection area relationship may be performed in any suitable manner. As an example, the producing the intersection area relationship may include producing a plot of the intersection area as a function of the size parameter, as illustrated in FIG. 9. Additionally or alternatively, the producing the intersection area relationship may include producing tabulated values of the area of intersection and the corresponding values of the size parameter. Additionally or alternatively, the producing the intersection area relationship may include producing a functional relationship between the area of intersection and the size parameter, such as via curve fitting the plurality of different size parameters and the corresponding plurality of areas of intersection. Additionally or alternatively, the producing the intersection area relationship may include determining a slope, an average slope, a minimum slope, and/or a maximum slope of the area of intersection as the function of the size parameter. Additionally or alternatively, the producing the intersection area relationship may include determining the slope of the area of intersection as the function of the size parameter for a specific value, or for specific values, of the size parameter. Additionally or alternatively, the producing the intersection area relationship may include determining the slope of the area of intersection as a function of the size parameter.

In some examples, the generating the intersection area relationship may include omitting, from the area of intersection, intersection of the surface of the virtual geometric shape with a region of the previously formed portion of the manufactured component, or with a previously formed portion of another manufactured component, that is not contiguous, or is discontinuous, with a region of the previously formed portion of the manufactured component that includes the addition location. In some examples, this omitted region eventually may be connected to the region of the previously formed portion of the manufactured component that includes the addition location, such as within the completed manufactured component. However, this omitted region may not be contiguous with, or connected to, the region of the previously formed portion of the manufactured component that includes the addition location. Such an omitted region may not provide a pathway for significant heat and/or energy dissipation from the addition location. As such, the omitting may permit more accurate generation of the intersection area relationship and/or of an intersection area relationship that accurately quantifies pathways for heat and/or energy dissipation within the previously formed portion of the manufactured component.

Figure 16:
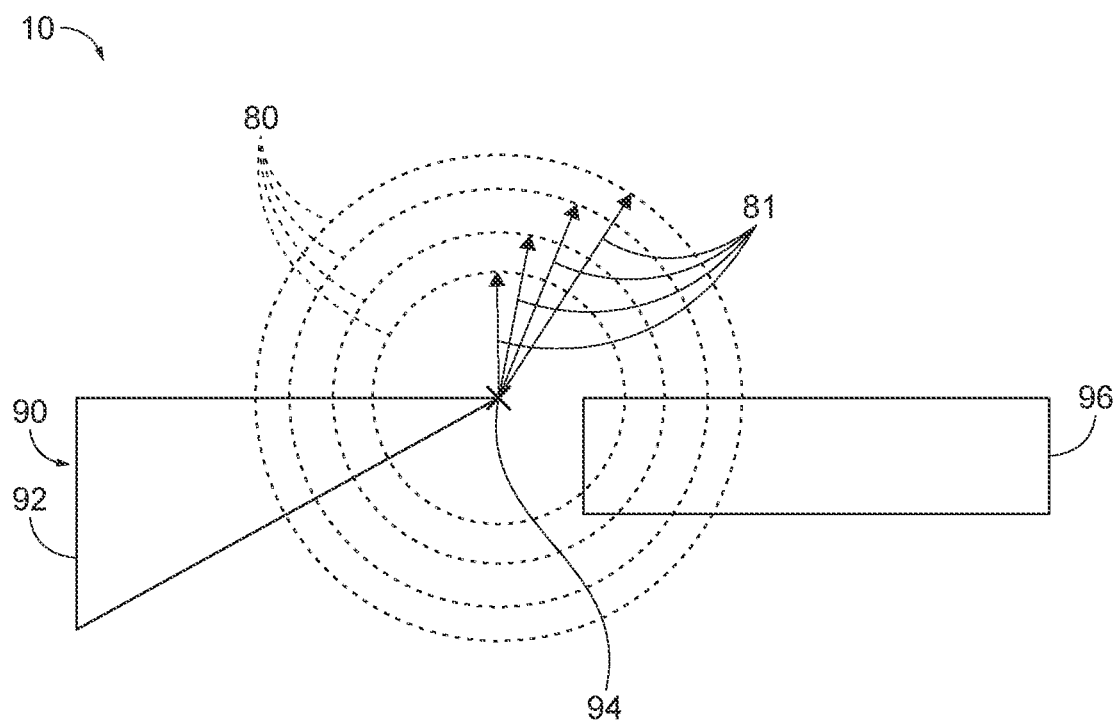
FIG. 16 is a schematic illustration of generation of an intersection relationship that may be utilized with methods, according to the present disclosure.

An example of the omitting is illustrated in FIG. 16. As illustrated therein, previously formed portion 92 of manufactured component 90 is illustrated as including addition location 94. In addition, a region 96 that is not contiguous with previously formed portion 92 also is illustrated. During generation of the intersection area relationship, virtual geometric shapes 80 with varying size parameters 81 may be positioned at addition location 94 and the area of intersection between each virtual geometric shape 80 and previously formed portion 92 may be determined, thereby permitting and/or facilitating determination of the intersection area relationship. However, and because region 96 does not provide significant heat and/or energy dissipation from addition location 94, an area of intersection between a given virtual geometric shape 80, with a given size parameter 81, and region 96 may not be included in the intersection area relationship.

It is within the scope of the present disclosure that the amount of energy, as delivered during the delivering at 130, may be based upon the intersection area relationship in any suitable manner. As an example, the delivering at 130 may include decreasing the amount of energy when a rate of change of the intersection area relationship with respect to the size parameter is less than a threshold rate of change and/or decreasing the amount of energy proportionate to the rate of change of the intersection area relationship. The threshold rate of change may have any suitable value, including a negative value, a positive value, or zero. As another example, the delivering at 130 may include increasing the amount of energy when the rate of change of the intersection area relationship with respect to the size parameter is greater than the threshold rate of change and/or increasing the amount of energy proportionate to the rate of change of the intersection area relationship. As yet another example, the delivering at 130 may include changing and/or specifying the amount of energy proportionate to the rate of change of the intersection area relationship. As another example, and when the rate of change of the intersection area relationship is less than the threshold rate of change, methods 100 may include determining that the addition location is proximate a void within the previously formed portion of the manufactured component. This may indicate that dissipation of heat and/or energy from the addition location may be less and/or slower than otherwise would be expected.

In a third example, and as discussed, during the delivering at 130, the amount of energy may be delivered along an axis of incidence. An example of the axis of incidence is illustrated in FIGS. 17-22 and indicated at 84. In this example, the energy dissipation parameter includes, is, or instead is a directionality parameter that is based, at least in part, on the axis of incidence.

Figure 17:
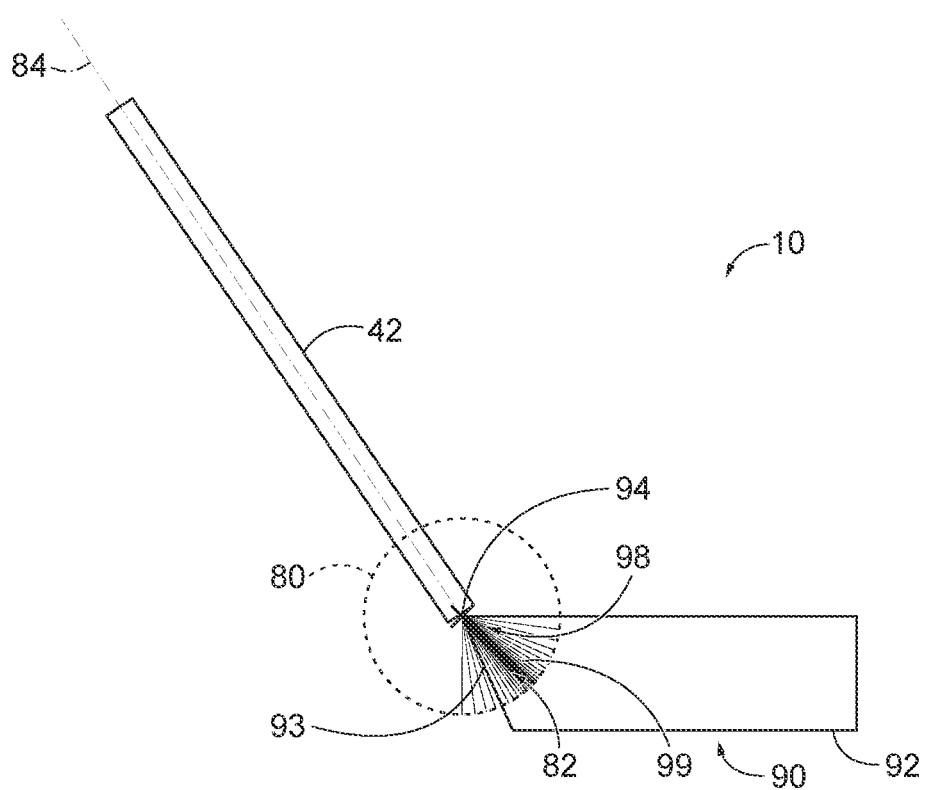
FIG. 17 is a schematic illustration of a directionality parameter that may be utilized with methods, according to the present disclosure.
Figure 18:
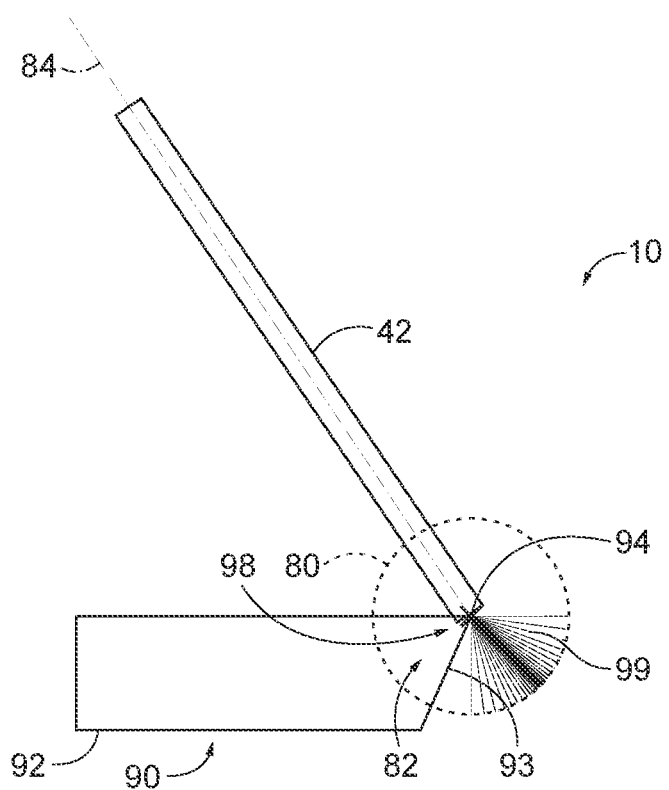
FIG. 18 is a schematic illustration of a directionality parameter that may be utilized with methods, according to the present disclosure.
Figure 19:
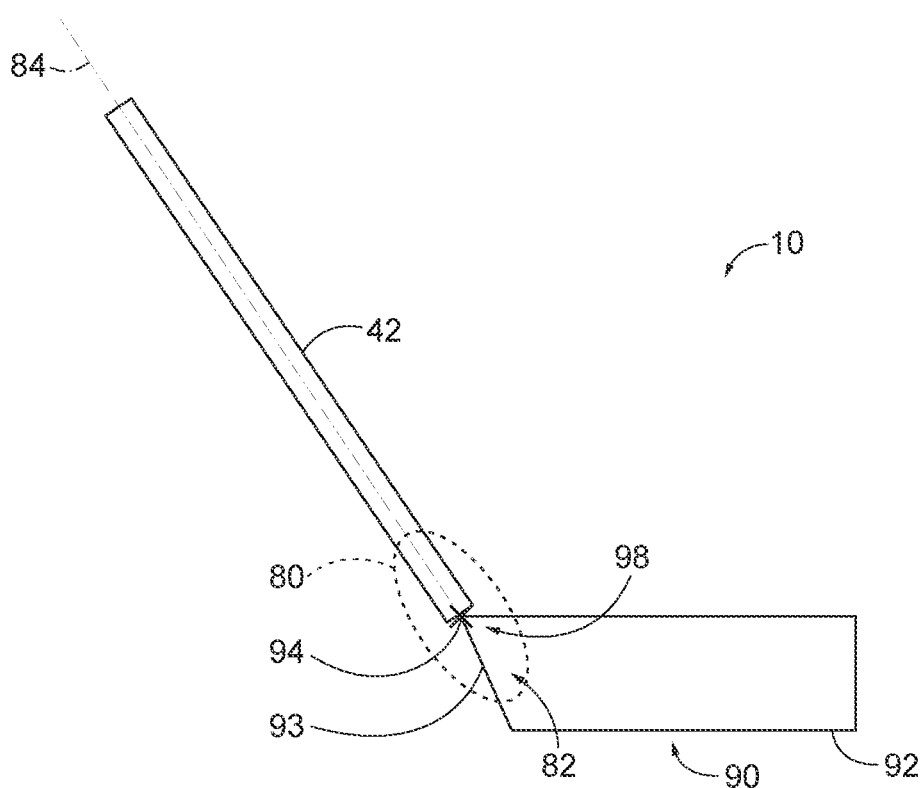
FIG. 19 is a schematic illustration of a directionality parameter that may be utilized with methods, according to the present disclosure.
Figure 20:
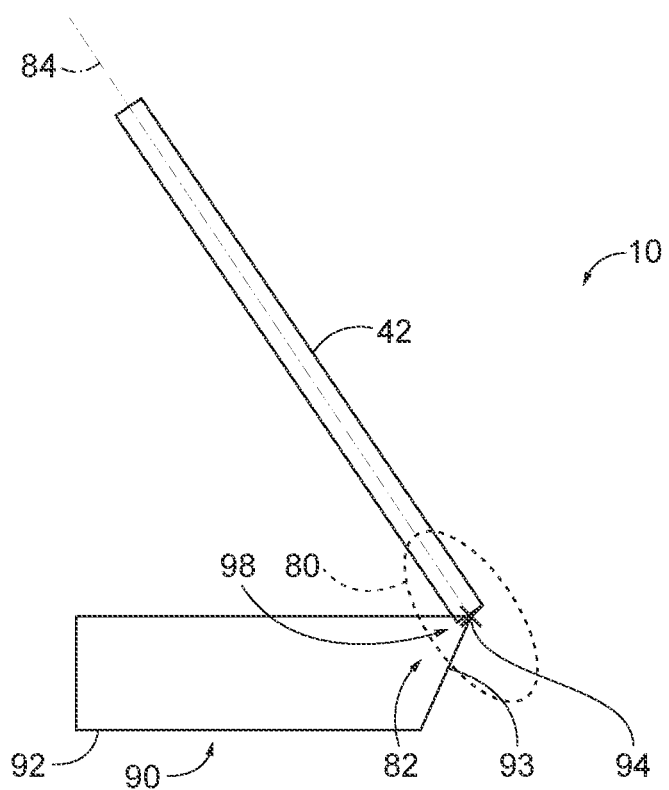
FIG. 20 is a schematic illustration of a directionality parameter that may be utilized with methods, according to the present disclosure.
Figure 21:
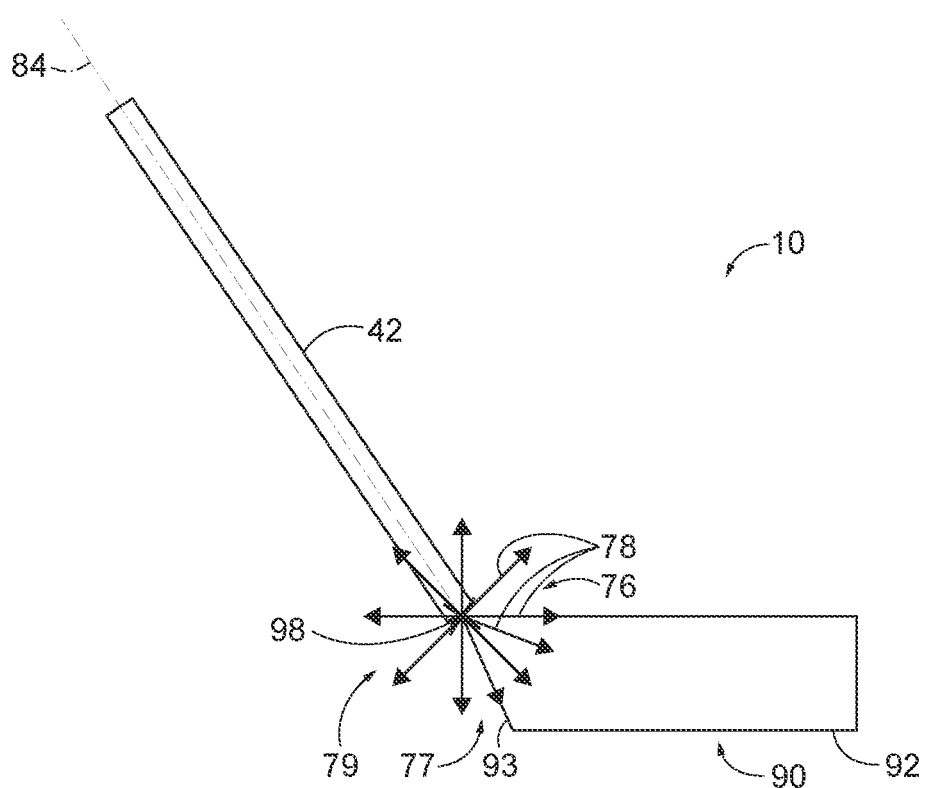
FIG. 21 is a schematic illustration of a directionality parameter that may be utilized with methods, according to the present disclosure.
Figure 22:
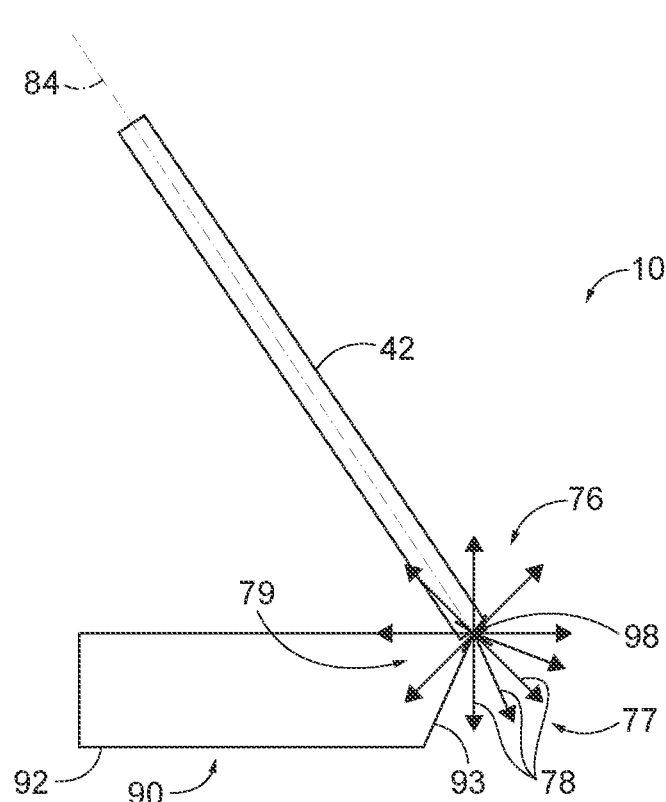
FIG. 22 is a schematic illustration of a directionality parameter that may be utilized with methods, according to the present disclosure.

Also in this example, the delivering at 130 may include delivering such that the amount of energy relatively increases when the directionality parameter indicates that the amount of energy is directed toward an edge of the previously formed portion of the manufactured component and an underlying surface of the previously formed portion of the manufactured component, which partially defines the edge, is relatively proximate the axis of incidence. This is illustrated in FIGS. 17, 19 and 21, where amount of energy 42 is directed toward an edge 98 of previously formed portion 92 of manufactured component 90 and an underlying surface 93 of previously formed portion 92 extends relatively proximate axis of incidence 84. Additionally or alternatively, the delivering at 130 may include delivering such that the amount of energy decreases when the directionality parameter indicates that the amount of energy is directed toward the edge of the previously formed portion of the manufactured component and the underlying surface of the previously formed portion of the manufactured component is relatively distal the axis of incidence. This is illustrated in FIGS. 18, 20 and 22, where amount of energy 42 is directed toward edge 98 of previously formed portion 92 of manufactured component 90 and underlying surface 93 extends distal axis of incidence 84 and/or relatively distal axis of incidence 84 compared to the examples illustrated in FIGS. 17, 19, and 21. Stated differently, the directionality parameter may indicate the orientation between the axis of incidence and the previously formed portion of the manufactured component, may indicate a direction of approach between the axis of incidence and the previously formed portion of the manufactured component, and/or may vary the amount of energy based upon this orientation and/or based upon this direction of approach.

As an example, and with reference to FIGS. 17-18, previously formed portion 92 may more readily absorb amount of energy 42, or may absorb a greater fraction of amount of energy 42, when axis of incidence 84 is directed toward edge 98, as illustrated in FIG. 17, when compared to when axis of incidence 84 is directed away from edge 98, as illustrated in FIG. 18. Thus, for a given addition location the amount of energy may be relatively higher when the directionality parameter indicates that the amount of energy is directed toward the edge of the previously formed portion of the manufactured component, and the amount of energy may be relatively lower when the directionality parameter indicates that the amount of energy is directed away from the edge of the previously formed portion of the manufactured component.

The directionality parameter may be determined and/or established in any suitable manner. The following are several illustrative, non-exclusive examples of directionality parameters and/or of mechanisms via which the directionality parameter may be determined, quantified, and/or utilized.

In some examples, the directionality parameter may include and/or be a weighting function, which may be applied to an internal volume of the virtual geometric shapes that are disclosed herein. The weighting function, when utilized, may provide additional weight to overlap volumes that are relatively proximate the axis of incidence within the virtual geometric shape when compared to overlap volumes that are relatively distal the axis of incidence within the virtual geometric shape. Stated differently, the weighting function may be relatively higher within a region of the virtual geometric shape that is relatively proximate the axis of incidence and/or that extends away from the addition location along the axis of incidence. Additionally or alternatively, the weighting function may be relatively lower within a region of the virtual geometric shape that is relatively distal the axis of incidence.

In some examples, the weighting function may be selected such that the amount of energy delivered, during the delivering at 130, is proportional to an extent to which the axis of incidence extends within the overlap volume. In some examples, a region of the axis of incidence extends away from the addition location and to a surface of the virtual geometric shape. In such examples, the weighting function may be selected such that the amount of energy is proportional to a magnitude of the region of the axis of incidence that extends within the overlap volume, such that the amount of energy is relatively higher when an entirety of the region of the axis of incidence extends within the overlap volume, such that the amount of energy is relatively lower when less than the entirety of the region of the axis of incidence extends within the overlap volume, such that the amount of energy is relatively higher when the weighting function increases a calculated value of the overlap volume, and/or such that the amount of energy is relatively lower when the weighting function decreases the calculated value of the overlap volume.

An example of the weighting function is illustrated in FIGS. 17-18. In FIGS. 17-18, the weighting function is illustrated by a shading gradient 99 within virtual geometric shape 80. More specifically, areas within virtual geometric shape 80 with a darker shading gradient 99 are weighted more heavily than areas within virtual geometric shape 80 with a lighter shading gradient 99. As illustrated, this will cause the same size overlap volume 82 to be weighted more heavily when amount of energy 42 is directed toward edge 98, as illustrated in FIG. 17, when compared to when amount of energy 42 is directed away from edge 98, as illustrated in FIG. 18.

In some examples, the directionality parameter may be determined and/or established by a shape of the virtual geometric shape. As an example, and as discussed, the virtual geometric shape may include and/or be an elongate virtual geometric shape that may be characterized by an elongate axis that extends along the axis of incidence of the amount of energy. Examples of such virtual geometric shapes include ellipsoids, cylinders, and cones. In such examples, the shape of the virtual geometric shape may generate overlap volumes that preferentially weight regions of the previously formed portion of the manufactured component that are relatively closer to the axis of incidence relative to regions of the previously formed portion of the manufactured component that are relatively farther from the axis of incidence.

Examples of how the shape of the virtual geometric shape may be utilized to preferentially weight regions of the previously formed portion of the manufactured component and/or may function as the directionality parameter are illustrated in FIGS. 17-20. A comparison between FIGS. 17-18 and FIGS. 19-20 illustrates that virtual geometric shapes 80 that define the elongate axis, such as the ellipsoids illustrated in FIGS. 19-20, may define overlap volumes 82 that emphasize axis of incidence 84, when compared to the spherical virtual geometric shapes 80 that are illustrated in FIGS. 17-18. FIG. 19 also illustrates that such virtual geometric shapes that define the elongate axis also will define larger overlap volumes 82 when axis of incidence 84 is directed toward edge 98, as illustrated in FIG. 19, when compared to when axis of incidence 84 is directed away from edge 98, as illustrated in FIG. 20.

In some examples, the directionality parameter may include and/or be a nonuniform vector field. The nonuniform vector field may include a plurality of vectors that radially extends from the addition location, and the delivering at 130 may include delivering such that the amount of energy is based, at least in part, on the nonuniform vector field. More specifically, the amount of energy may be based, at least in part, on a number of vectors in the plurality of vectors that extends within the previously formed portion of the manufactured component. Thus, and as illustrated in FIGS. 21-22, a density of vectors 78 within various regions of a nonuniform vector field 76 may be varied in order to preferentially weight the amount of energy higher for certain relative orientations between amount of energy 42 and previously formed portion 92 of manufactured component 90. As an example, nonuniform vector field 76 may be configured such that the number of vectors 78 that extend within previously formed portion 92 may be relatively higher when axis of incidence 84 points toward previously formed portion 92, as illustrated in FIG. 21, and also such that the number of vectors 78 that extends within previously formed portion 92 may be relatively lower when axis of incidence 84 points away from previously formed portion 92, as illustrated in FIG. 22.

As an example, the nonuniform vector field may include a high-density region, which includes a relatively higher density of the plurality of vectors, and a low-density region, which includes a remainder of the plurality of vectors. The high-density region is illustrated in FIGS. 21-22 and indicated at 77. The low-density region is illustrated in FIGS. 21-22 and indicated at 79. In some such examples, the axis of incidence may extend within and/or through the high-density region. This is illustrated in FIGS. 21-22, with axis of incidence 84 extending within and/or being surrounded by high-density region 77. In some such examples, the high-density region may extend away from the addition location along the axis of incidence. This is also illustrated in FIGS. 21-22, with high-density region 77 extending away from addition location 94 along axis of incidence 84.

In some examples, the energy application parameter also may include a process parameter. The process parameter may be based, at least in part, on at least one process condition of and/or utilized during methods 100. Examples of the at least one process condition include a thermal conductivity of the previously formed portion of the manufactured component, a layer thickness of the additional portion of the manufactured component, a gas flow rate of a gas provided to the addition location, and/or a granular volume, or average granular volume, of the feedstock material. Such a configuration may permit and/or facilitate adjustment of the amount of energy based upon the at least one process condition.

As an example, the thermal conductivity of the previously formed portion of the manufactured component may vary with location on the previously formed portion of the manufactured component. With this in mind, the amount of energy may be increased responsive to an increase in the thermal conductivity of the previously formed portion of the manufactured component and/or may be decreased responsive to a decrease in the thermal conductivity of the previously formed portion of the manufactured component. Such a configuration may permit and/or facilitate improved regulation of melt pool size and/or of material properties of the manufactured component despite variation, with location, in the rate at which the previously formed portion of the manufactured component dissipates energy and/or heat from the addition location.

Illustrative, non-exclusive examples of inventive subject matter according to the present disclosure are described in the following enumerated paragraphs:

A1. A method (100) of additively manufacturing a manufactured component (90), the method (100) comprising:
   determining (110) an energy application parameter at an addition location (94) on a previously formed portion (92) of the manufactured component (90);
   supplying (120) a feedstock material (32) to the addition location (94);
   delivering (130), from an energy source (40) and to the addition location (94), an amount of energy (42) sufficient to form a melt pool (38) of the feedstock material (32) at the addition location (94), wherein the amount of energy (42) is based, at least in part, on the energy application parameter; and
   consolidating (140) the melt pool (38) with the previously formed portion (92) of the manufactured component (90) to form an additional portion of the manufactured component (90).

A2. The method (100) of paragraph A1, wherein the determining (110) the energy application parameter includes determining the energy application parameter based, at least in part, on a rate of thermal energy dissipation at the addition location (94) and within the previously formed portion (92) of the manufactured component (90).

A3. The method (100) of any of paragraphs A1-A2, wherein the determining (110) the energy application parameter includes determining the energy application parameter based, at least in part, on an angle of incidence between the addition location (94) and the amount of energy (42).

A4. The method (100) of any of paragraphs A1-A3, wherein the determining (110) the energy application parameter includes determining the energy application parameter based, at least in part, on an efficiency of absorption of the amount of energy (42) by the previously formed portion (92) of the manufactured component (90).

A5. The method (100) of any of paragraphs A1-A4, wherein the determining (110) the energy application parameter includes determining the energy application parameter based, at least in part, on a direction of absorption of the amount of energy (42) by the previously formed portion (92) of the manufactured component (90).

A6. The method (100) of any of paragraphs A1-A5, wherein the determining (110) the energy application parameter includes determining the energy application parameter based, at least in part, on a material property of the feedstock material (32), optionally wherein the material property of the feedstock material (32) includes at least one of:
   (i) a latent heat of fusion of the feedstock material (32);
   (ii) a thermal conductivity of the feedstock material (32); and
   (iii) a melting point of the feedstock material (32).

A7. The method (100) of any of paragraphs A1-A6, wherein the determining (110) the energy application parameter includes determining the energy application parameter based, at least in part, on a material property of the previously formed portion (92) of the manufactured component (90), optionally wherein the material property of the previously formed portion (92) of the manufactured component (90) includes at least one of:
   (i) a latent heat of fusion of the previously formed portion (92) of the manufactured component (90);
   (ii) a thermal conductivity of the previously formed portion (92) of the manufactured component (90); and
   (iii) a melting point of the previously formed portion (92) of the manufactured component (90).

A8. The method (100) of any of paragraphs A1-A7, wherein the determining (110) the energy application parameter includes determining the energy application parameter based, at least in part, on a shape of the previously formed portion (92) of the manufactured component (90).

A9. The method (100) of any of paragraphs A1-A8, wherein the determining (110) the energy application parameter includes determining the energy application parameter based, at least in part, on a temperature of the previously formed portion (92) of the manufactured component (90).

A10. The method (100) of any of paragraphs A1-A9, wherein the determining (110) the energy application parameter includes determining the energy application parameter based, at least in part, on an environmental factor of an environment surrounding the previously formed portion (92) of the manufactured component (90), optionally wherein the environmental factor includes at least one of:
   (i) a material property of an environmental gas within the environment surrounding the previously formed portion (92) of the manufactured component (90); and
   (ii) a material property of a support platform (20) that supports the previously formed portion (92) of the manufactured component (90).

A11. The method (100) of any of paragraphs A1-A10, wherein the supplying (120) the feedstock material (32) includes supplying a powder feedstock material, optionally wherein the powder feedstock material includes at least one of a metallic powder feedstock material, a polymeric powder feedstock material, and a composite powder feedstock material.

A12. The method (100) of any of paragraphs A1-A11, wherein the supplying (120) the feedstock material (32) includes supplying a feedstock material filament, optionally wherein the feedstock material filament includes at least one of a wire, an electrically conductive filament, a metallic filament, a polymeric filament, and a composite filament.

A13. The method (100) of any of paragraphs A1-A12, wherein the supplying (120) the feedstock material (32) includes distributing a layer of the feedstock material (32) on a surface, or an exposed upper surface, of the previously formed portion (92) of the manufactured component (90).

A14. The method (100) of paragraph A13, wherein the supplying (120) the feedstock material (32) is prior to the delivering (130) the amount of energy (42).

A15. The method (100) of any of paragraphs A1-A13, wherein the supplying (120) the feedstock material (32) includes supplying the feedstock material (32) concurrently with the delivering (130) the amount of energy (42).

A16. The method (100) of paragraph A15, wherein the delivering (130) the amount of energy (42) includes delivering the amount of energy (42) via the feedstock material (32).

A17. The method (100) of any of paragraphs A15-A16, wherein the delivering (130) the amount of energy (42) includes delivering the amount of energy (42) via an energy delivery mechanism (41) that is distinct from the feedstock material (32).

A18. The method (100) of any of paragraphs A1-A17, wherein the amount of energy (42) is at least one of:
 (i) proportional to the energy application parameter;
 (ii) directly proportional to the energy application parameter; and
 (iii) linearly proportional to the energy application parameter.

A19. The method (100) of any of paragraphs A1-A18, wherein the amount of energy (42) increases with an increase in the energy application parameter.

A20. The method (100) of any of paragraphs A1-A19, wherein the amount of energy (42) decreases with a decrease in the energy application parameter.

A21. The method (100 of any of paragraphs A1-A20, wherein the delivering (130) further includes selectively varying the amount of energy (42) based, at least in part, on the energy application parameter.

A22. The method (100) of paragraph A21, wherein the selectively varying includes selectively varying at least one of:
 (i) a power consumption of the energy source (40);
 (ii) an intensity of energy incident upon the addition location (94);
 (iii) an exposure time of energy incident upon the addition location (94); and
 (iv) an application area over which the energy is incident upon the addition location (94).

A23. The method (100) of any of paragraphs A1-A22, wherein the energy source (40) includes at least one of:
 (i) an electrical power source;
 (ii) a source of electromagnetic radiation;
 (iii) a laser beam source;
 (iv) an electron beam source; and
 (v) a heat source.

A24. The method (100) of any of paragraphs A1-A23, wherein the amount of energy (42) includes at least one of:
 (i) an amount of electric energy;
 (ii) an amount of photon energy;
 (iii) an amount of electron beam energy; and
 (iv) an amount of heat.

A25. The method (100) of any of paragraphs A1-A24, wherein the consolidating (430) the melt pool (38) includes cooling the melt pool (38) to below a melting temperature of the feedstock material (32).

A26. The method (100) of any of paragraphs A1-A25, wherein the consolidating (140) the melt pool (38) includes solidifying the melt pool (38).

A27. The method (100) of any of paragraphs A1-A26, wherein the consolidating (140) the melt pool (38) includes fusing the feedstock material (32), from the melt pool (38), to the previously formed portion (92) of the manufactured component (90).

A28. The method (100) of any of paragraphs A1-A27, wherein the feedstock material (32) includes a/the powder feedstock material, and further wherein the supplying (120) the feedstock material (32) includes distributing a/the layer of the powder feedstock material on a/the surface, or an/the exposed upper surface, of the previously formed portion (92) of the manufactured component (90).

A29. The method (100) of paragraph A28, wherein the addition location (94) is defined on the surface of the previously formed portion (92) of the manufactured component (90).

A30. The method (100) of any of paragraphs A28-A29, wherein the distributing the layer of the powder feedstock material is performed prior to the delivering (130) the amount of energy (42).

A31. The method (100) of any of paragraphs A1-A30, wherein the feedstock material (32) includes a/the powder feedstock material, and further wherein the supplying (120) the feedstock material (32) includes flowing the feedstock material (32) to the addition location (94) as a feedstock material stream.

A32. The method (100) of paragraph A31, wherein the delivering (1300 the amount of energy (42) includes delivering the amount of energy (42) concurrently with the flowing the feedstock material (32).

A33. The method (100) of any of paragraphs A1-A32, wherein the feedstock material (32) includes a/the feedstock material filament, and further wherein the supplying (120) the feedstock material (32) includes conveying the feedstock material filament to the addition location (94).

A34. The method (100) of paragraph A33, wherein the delivering (130) the amount of energy (42) includes delivering the amount of energy (42) via the feedstock material filament.

A35. The method (100) of any of paragraphs A33-A34, wherein the delivering (130) the amount of energy (42) includes delivering the amount of energy (42) via an/the energy delivery mechanism (41), which is distinct from the feedstock material (32).

A36. The method (100) of any of paragraphs A33-A35, wherein the delivering (130) the amount of energy (42) includes delivering the amount of energy (42) concurrently with the conveying the feedstock material filament.

A37. The method (100) of any of paragraphs A1-A36, wherein the addition location (94) is a first addition location (94), wherein the energy application parameter is a first energy application parameter, wherein the amount of energy (42) is a first amount of energy (42), wherein the melt pool (38) is a first melt pool (38), and further wherein the method (100) includes repeating (150) the method (100) by:
 Determining (110) a second energy application parameter at a second addition location (94) on the previously formed portion (92) of the manufactured component (90);
 Supplying (120) the feedstock material (32) to the second addition location (94);
 Delivering (130), from the energy source (40) and to the second addition location (94), a second amount of energy (42) sufficient to form a second melt pool (38) of the feedstock material (32) at the second addition location (94), wherein the second amount of energy (42) is based, at least in part, on the second energy application parameter; and Consolidating (140) the second melt pool (38) with the previously formed portion (92) of the manufactured component (90) to form a second additional portion of the manufactured component (90).

A38. The method (100) of paragraph A37, wherein the second energy application parameter differs from the first energy application parameter, and further wherein the second amount of energy (42) differs from the first amount of energy (42).

A39. The method (100) of any of paragraphs A37-A38, wherein a first melt pool size of the first melt pool (38) is equal, or at least substantially equal, to a second melt pool size of the second melt pool (38).

A40. The method (100) of any of paragraphs A37-A39, wherein a first melt pool shape of the first melt pool (38) is equal, or at least substantially equal, to a second melt pool shape of the second melt pool (38).

A41. The method (100) of any of paragraphs A37-A40, wherein the determining (110) the first energy application parameter and the determining (110) the second energy application parameter include determining such that the second melt pool (38) is within a threshold melt pool size range of the first melt pool (38), optionally wherein the threshold melt pool size range is at least one of:
  (i) at least 80%, at least 85%, at least 90%, at least 95%, at least 97.5%, or at least 99% of the first melt pool size; and
  (ii) at most 120%, at most 115%, at most 110%, at most 105%, at most 102.5%, or at most 101% of the first melt pool size.

A42. The method (100) of any of paragraphs A37-A41, wherein the determining (110) the first energy application parameter and the determining (110) the second energy application parameter include determining such that a second penetration depth of the second melt pool (38) into the previously formed portion (92) of the manufactured component (90) is within a threshold penetration depth range of a first penetration depth of the first melt pool (38) into the previously formed portion (92) of the manufactured component (90), optionally wherein the threshold penetration depth range is at least one of:
  (i) at least 80%, at least 85%, at least 90%, at least 95%, at least 97.5%, or at least 99% of the first penetration depth; and
  (ii) at most 120%, at most 115%, at most 110%, at most 105%, at most 102.5%, or at most 101% of the first penetration depth.

A43. The method (100) of any of paragraphs A1-A42, wherein the method (100) includes repeating (150) at least the determining (110), the delivering (130), and the consolidating (140) a plurality of times at a plurality of addition locations (94) to fully define the manufactured component (90). A44. The method (100) of paragraph A43, wherein the repeating (150) includes selecting the amount of energy (42) at each addition location (94) of the plurality of addition locations (94) based, at least in part, on a corresponding energy application parameter at each addition location (94).

A45. The method (100) of paragraph A44, wherein the selecting includes at least one of:
  (i) increasing the amount of energy (42) at a given addition location of the plurality of addition locations (94), relative to another addition location (94) of the plurality of addition locations (94), responsive to an increase in the corresponding energy application parameter at the given addition location (94) relative to the other addition location (94);
  (ii) increasing the amount of energy (42) at the given addition location (94), relative to the other addition location (94), responsive to a decrease in the corresponding energy application parameter at the given addition location (94) relative to the other addition location (94);
  (III) decreasing the amount of energy (42) at the given addition location (94), relative to the other addition location (94), responsive to a decrease in the corresponding energy application parameter at the given addition location (94) relative to the other addition location (94); and
  (iv) decreasing the amount of energy (42) at the given addition location (94), relative to the other addition location (94), responsive to an increase in the corresponding energy application parameter at the given addition location (94) relative to the other addition location (94).

A46. The method (100) of any of paragraphs A43-A45, wherein, for a given addition location (94) of the plurality of addition locations (94), the repeating (150) further includes adjusting the amount of energy (42) based, at least in part, on an already delivered amount of energy (42) that already has been delivered to the previously formed portion (92) of the manufactured component (90).

B1. The method (100) of any of paragraphs A1-A46, wherein the energy application parameter includes, or instead is, an overlap volume (82) between a virtual geometric shape (80), which is positioned at the addition location (94), and the previously formed portion (92) of the manufactured component (90).

B2. The method (100) of paragraph B1, wherein a centroid of the virtual geometric shape (80) is positioned at the addition location (94).

B3. The method (100) of any of paragraphs B1-B2, wherein, during the delivering (130), the amount of energy (42) is delivered to the addition location (94) along an axis of incidence (84), and further wherein the virtual geometric shape (80) is rotationally symmetric about the axis of incidence (84).

B4. The method (100) of paragraph B3, wherein the virtual geometric shape (80) defines an elongate axis, and further wherein the elongate axis extends along the axis of incidence (84).

B5. The method (100) of any of paragraphs B1-B4, wherein the virtual geometric shape (80) at least one of:
  (i) has a predetermined size;
  (ii) has a predetermined volume;
  (iii) has a fixed size; and
  (iv) has a fixed volume.

B6. The method (100) of any of paragraphs B1-B5, wherein the virtual geometric shape (80) is a spherical, or at least partially spherical, virtual geometric shape (80).

B7. The method (100) of any of paragraphs B1-B6, wherein the overlap volume (82) is a partially spherical overlap volume (82).

B8. The method (100) of any of paragraphs B1-B7, wherein the virtual geometric shape (80) is an ellipsoidal, or at least partially ellipsoidal, virtual geometric shape (80).

B9. The method (100) of any of paragraphs B1-B8, wherein the overlap volume (82) is a partially ellipsoidal overlap volume (82).

B10. The method (100) of any of paragraphs B1-B9, wherein the virtual geometric shape (80) defines a virtual geometric shape volume, and further wherein the overlap volume (82) is at most half of the virtual geometric shape volume.

B11. The method (100) of any of paragraphs B1-1310, wherein the method (100) further includes varying a position of the addition location (94) on the previously formed portion (92) of the manufactured component (90) to define a/the plurality of addition locations (94), and further wherein, during the varying the method (100) includes repeating (150) at least the determining (110), the delivering (130), and the consolidating (140) a plurality of times at the plurality of addition locations (94) to fully define the manufactured component (90).

B12. The method (100) of paragraph B11, wherein the repeating (150) the determining (110) includes determining a corresponding overlap volume (82) at each addition location (94) of the plurality of addition locations (94).

B13. The method (100) of paragraph B12, wherein the repeating (150) the delivering (130) includes delivering a corresponding amount of energy (42) at each addition location (94) of the plurality of addition locations (94).

B14. The method (100) of paragraph B13, wherein, responsive to the corresponding overlap volume (82) at a given addition location (94) of the plurality of addition locations (94) decreasing from the corresponding overlap volume (82) at a prior addition location (94) of the plurality of addition locations (94), the repeating (150) the delivering (130) includes decreasing the corresponding amount of energy (42) delivered at the given addition location (94) relative to the corresponding amount of energy (42) delivered at the prior addition location (94).

B15. The method (100) of any of paragraphs B13-B14, wherein, responsive to the corresponding overlap volume (82) at a given addition location (94) of the plurality of addition locations (94) increasing from the corresponding overlap volume (82) at a prior addition location (94) of the plurality of addition locations (94), the repeating the delivering includes increasing the corresponding amount of energy (42) delivered at the given addition location (94) relative to the corresponding amount of energy (42) delivered at the prior addition location (94).

B15.1 The method (100) of any of paragraphs B13-B15, wherein the corresponding amount of energy (42) is proportional to the corresponding overlap volume (82).

B16. The method (100) of any of paragraphs B1-B15.1, wherein the overlap volume (82) is a first overlap volume (82), and further wherein the overlap volume (82) includes a second overlap volume (88) between the virtual geometric shape (80) and at least one environmental component (89) in an/the environment surrounding the previously formed portion (92) of the manufactured component (90).

B17. The method (100) of paragraph B16, wherein the at least one environmental component (89) includes at least one of:
(i) a/the support platform (20) for the previously formed portion (92) of the manufactured component (90);
(ii) the feedstock material (32);
(iii) a/the environmental gas within the environment surrounding the previously formed portion (92) of the manufactured component (90);
(iv) a region (96) of the manufactured component (90) that is discontinuous with the previously formed portion (92) of the manufactured component (90) within the overlap volume (82); and
(v) a region (96) of another manufactured component (90) that is discontinuous with the previously formed portion (92) of the manufactured component (90) within the overlap volume (82).

B18. The method (100) of any of paragraphs B16-B17, wherein at least one of:

(i) the amount of energy (42) is based, at least in part, on both the first overlap volume (82) and the second overlap volume (88), optionally wherein the amount of energy (42) is weighted differently for the first overlap volume (82) and for the second overlap volume (88); and
(ii) the amount of energy (42) is based, at least in part, on only the first overlap volume (82).

C1. The method (100) of any of paragraphs A1-618, wherein the energy application parameter includes, or instead is, an intersection area relationship, wherein the intersection area relationship describes an area of intersection (70) between the previously formed portion (92) of the manufactured component (90) and a surface of a/the virtual geometric shape (80), which is positioned at the addition location (94), as a function of a size parameter (81) of the virtual geometric shape (80).

C2. The method (100) of paragraph C1, wherein the intersection area relationship includes at least one of:
(i) a plot of the area of intersection (70) as a function of the size parameter (81);
(ii) tabulated values of the area of intersection (70) and corresponding values of the size parameter (81); and
(iii) a functional relationship between the area of intersection (70) and the size parameter (81).

C3. The method (100) of any of paragraphs C1-C2, wherein, for a given size parameter (81) of the virtual geometric shape (80), a corresponding area of intersection (70) quantifies a surface area of an outer surface of the virtual geometric shape (80) that extends within the previously formed portion (92) of the manufactured component (90).

C4. The method (100) of any of paragraphs C1-C3, wherein the virtual geometric shape (80) has a constant, or at least substantially constant, shape.

C5. The method (100) of any of paragraphs C1-C4, wherein, for a given size parameter (81), the virtual geometric shape (80) has a given virtual geometric shape volume that corresponds to the given size parameter (81).

C6. The method (100) of any of paragraphs C1-05, wherein the virtual geometric shape (80) is a/the spherical, or at least partially spherical, virtual geometric shape (80).

C7. The method (100) of any of paragraphs C1-C6, wherein the size parameter (81) is indicative of at least one of:
(i) a volume of the virtual geometric shape (80); and
(ii) a surface area of the virtual geometric shape (80).

C8. The method (100) of any of paragraphs C1-C7, wherein the size parameter (81) includes at least one of:
(i) a radius of the virtual geometric shape (80);
(ii) a diameter of the virtual geometric shape (80);
(iii) an effective radius of the virtual geometric shape (80); and
(iv) an effective diameter of the virtual geometric shape (80).

C9. The method (100) of any of paragraphs C1-C8, wherein the determining (110) further includes generating the intersection area relationship (70).

C10. The method (100) of paragraph C9, wherein the generating includes quantifying the area of intersection (70) between the previously formed portion (92) of the manufactured component (90) and the surface of the virtual geometric shape (80) for a plurality of different size parameters (81).

C11. The method (100) of any of paragraphs C9-C10, wherein the generating includes:

(i) virtually positioning the virtual geometric shape (80) at the addition location (94);
(ii) determining, for a/the plurality of different size parameters (81) of the virtual geometric shape (80), a corresponding plurality of areas of intersection (70) between the previously formed portion (92) of the manufactured component (90) and the surface of the virtual geometric shape (80); and
(iv) producing the intersection area relationship based, at least in part, on the plurality of different size parameters (81) and the corresponding plurality of areas of intersection (70).

C12. The method (100) of paragraph C11, wherein the virtually positioning includes virtually positioning a/the centroid of the virtual geometric shape (80) at the addition location (94).

C13. The method (100) of any of paragraphs C11-C12, wherein the producing the intersection area relationship includes at least one of:
(i) producing a/the plot of the area of intersection (70) as a function of the size parameter (81);
producing tabulated values of the area of intersection (70) and corresponding values of the size parameter (81);
(iii) producing a/the functional relationship between the area of intersection (70) and the size parameter (81);
(iv) determining a slope of the area of intersection (70) as the function of the size parameter (81);
(v) determining an average slope of the area of intersection (70) as the function of the size parameter (81);
(vi) determining a minimum slope of the area of intersection (70) as the function of the size parameter (81); and
(vii) determining the slope of the area of intersection (70) as the function of the size parameter (81) for a specific value of the size parameter (81).

C14. The method (100) of any of paragraphs C9-C13, wherein, during the generating, the method further includes omitting, from the area of intersection (70), intersection of the surface of the virtual geometric shape (80) with a region (96) of the previously formed portion (92) of the manufactured component (90) that is not contiguous with a region of the previously formed portion (92) of the manufactured component (90) that includes the addition location (94).

C15. The method (100) of any of paragraphs C1-C14, wherein the method (100) further includes decreasing the amount of energy (42) when a rate of change of the intersection area relationship is less than a threshold rate of change.

C16. The method (100) of any of paragraphs C1-C15, wherein the method (100) further includes increasing the amount of energy (42) when a/the rate of change of the intersection area relationship is greater than a/the threshold rate of change.

C17. The method (100) of any of paragraphs C1-C16, wherein the method (100) further includes changing the amount of energy (42) proportionate to a/the rate of change of the intersection area relationship.

C18. The method (100) of any of paragraphs C1-C17, wherein, when a/the rate of change of the intersection area relationship is less than a/the threshold rate of change, the method (100) further includes determining that the addition location (94) is proximate a gap (72) within the previously formed portion (92) of the manufactured component (90).

D1. The method (100) of any of paragraphs A1-C18, wherein, during the delivering (130), the amount of energy (42) is delivered to the addition location (94) along an/the axis of incidence (84), and further wherein the energy application parameter includes, or instead is, a directionality parameter that is based, at least in part, on the axis of incidence (84).

D2. The method (100) of paragraph D1, wherein the delivering (130) includes delivering such that the amount of energy (42) relatively increases when the directionality parameter indicates that the amount of energy (42) is directed toward an edge (98) of the previously formed portion (92) of the manufactured component (90) and an underlying surface of the previously formed portion (92) of the manufactured component (90), which partially defines the edge (98), is relatively proximate the axis of incidence (84).

D3. The method (100) of any of paragraphs D1-D2, wherein the delivering (130) includes delivering such that the amount of energy (42) decreases when the directionality parameter indicates that the amount of energy (42) is directed toward an/the edge (98) of the previously formed portion (92) of the manufactured component (90) and an/the underlying surface of the previously formed portion (92) of the manufactured component (90), which partially defines the edge (98), is relatively distal the axis of incidence (84).

D4. The method (100) of any of paragraphs D1-D3, wherein, for a given addition location (94), the delivering (130) includes delivering such that:
(i) the amount of energy (42) is relatively higher when the directionality parameter indicates that the amount of energy (42) is directed toward an/the edge (98) of the previously formed portion (92) of the manufactured component (90) and an/the underlying surface of the previously formed portion (92) of the manufactured component (90), which partially defines the edge (98), is relatively proximate the axis of incidence (84); and
(ii) the amount of energy (42) is relatively lower when the directionality parameter indicates that the amount of energy (42) is directed toward the edge (98) of the previously formed portion (92) of the manufactured component (90) and the underlying surface of the previously formed portion (92) of the manufactured component (90), which partially defines the edge (98), is relatively distal the axis of incidence (84).

D5. The method (100) of any of paragraphs D1-D4, wherein the energy application parameter further includes a process parameter that is based, at least in part, on at least one process condition of the method (100).

D6. The method (100) of paragraph D5, wherein the at least one process condition includes at least one of:
(i) a thermal conductivity of the previously formed portion (92) of the manufactured component (90);
(ii) a layer thickness of the additional portion of the manufactured component (90);
(iii) a gas flow rate of a gas provided to the addition location (94); and
(iv) a granular volume, or average granular volume, of the feedstock material (32).

D7. The method (100) of any of paragraphs D1-D6 when dependent from any of paragraphs B1-B18, wherein the directionality parameter includes a weighting function, which is applied to an internal volume of the virtual geometric shape (80).

D8. The method (100) of paragraph D7, wherein:
(i) the weighting function is relatively higher within a region of the virtual geometric shape (80) that is relatively proximate the axis of incidence (84) and extends away from the addition location (94) along the axis of incidence (84); and (ii) the weighting function is relatively lower within a region of the virtual geometric shape (80) that is relatively distal the axis of incidence (84).

D9. The method (100) of any of paragraphs D7-D8, wherein the weighting function is selected such that the amount of energy (42) is proportional to an extent to which the axis of incidence (84) extends within the overlap volume (82).

D10. The method (100) of any of paragraphs D7-D9, wherein a region of the axis of incidence (84) extends away from the addition location (94) and to a surface of the virtual geometric shape (80), and further wherein the weighting function is selected such that at least one of:
  (i) the amount of energy (42) is proportional to a magnitude of the region of the axis of incidence (84) that extends within the overlap volume (82);
  (ii) the amount of energy (42) is relatively higher when an entirety of the region of the axis of incidence (84) extends within the overlap volume (82);
  (iii) the amount of energy (42) is relatively lower when less than the entirety of the region of the axis of incidence (84) extends within the overlap volume (82);
  (iv) the amount of energy (42) is relatively higher when the weighting function increases a calculated value of the overlap volume (82); and
  (v) the amount of energy (42) is relatively lower when the weighting function decreases a/the calculated value of the overlap volume (82).

D11. The method (100) of any of paragraphs D1-D10 when dependent from any of paragraphs B1-B18, wherein the directionality parameter includes a shape of the virtual geometric shape (80).

D12. The method (100) of paragraph D11, wherein the shape is an elongate virtual geometric shape (80) that is characterized by an/the elongate axis, which extends along the axis of incidence (84).

D13. The method (100) of any of paragraphs D11-D12, wherein the virtual geometric shape (80) includes at least one of an ellipsoid and a cylinder.

D14. The method (100) of any of paragraphs D1-D13, wherein the directionality parameter includes a nonuniform vector field (76), which includes a plurality of vectors (78) that radially extends from the addition location (94), and further wherein the delivering (130) includes delivering such that the amount of energy (42) is based, at least in part, on a number of vectors (78) in the plurality of vectors (78) that extends within the previously formed portion (92) of the manufactured component (90).

D15. The method (100) of paragraph D14, wherein the nonuniform vector field (76) includes a high-density region (77), which includes a relatively higher density of vectors (78) of the plurality of vectors (78), and a low-density region (79), which includes a remainder of the plurality of vectors (78).

D16. The method (100) of paragraph D15, wherein the axis of incidence (84) extends within the high-density region (77).

D17. The method (100) of any of paragraphs D15-D16, wherein the high-density region (77) extends away from the addition location (94) along the axis of incidence (84).

E1. An additive manufacturing system (10) for additively manufacturing a manufactured component (90), the additive manufacturing system (10) comprising:
  a support platform (20) configured to support the manufactured component (90) during additive manufacture of the manufactured component (90);
  a feedstock supply system (30) configured to supply a feedstock material (32) to an addition location (94) of the manufactured component (90);
  an energy source (40) configured to deliver an amount of energy (42) to the addition location (94); and
  a controller (60) programmed to control the operation of the additive manufacturing system (10) according to the method (100) of any of paragraphs A1-D17.

E2. The system (10) of paragraph E1, wherein the feedstock supply system (30) includes at least one of:
  (i) a powder supply system configured to supply the feedstock material (32) in the form of a feedstock material powder; and
  (ii) a filament supply system configured to supply the feedstock material (32) in the form of a feedstock material filament.

E3. The system (10) of any of paragraphs E1-E2, wherein the energy source (40) includes at least one of:
  (i) an electrical power source;
  (ii) a source of electromagnetic radiation;
  (iii) a laser beam source;
  (iv) an electron beam source; and
  (v) a heat source.

F1. Non-transitory computer readable storage media (62) including computer-executable instructions that, when executed, direct an additive manufacturing system (10) to perform the method (100) of any of paragraphs A1-D17.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of additively manufacturing a manufactured component, the method comprising:
   determining an energy application parameter at an addition location on a previously formed portion of the manufactured component by:
   (i) virtually positioning a virtual geometric shape at the addition location, wherein the virtual geometric shape is characterized by a size parameter that is indicative of a surface area of the virtual geometric shape;
   (ii) during the virtually positioning, quantifying an area of intersection between the previously formed portion of the manufactured component and an outer surface of the virtual geometric shape;
   (iii) repeating the virtually positioning and the quantifying for a plurality of different virtual geometric shapes, wherein each virtual geometric shape of the plurality of different virtual geometric shapes is characterized by a corresponding size parameter that differs from the size parameter of each other virtual geometric shape of the plurality of different virtual geometric shapes, and further wherein all proportions of each virtual geometric shape are identical to all proportions of each other virtual geometric shape;
   (iv) producing an intersection area relationship that quantifies each area of intersection for each virtual geometric shape of the plurality of different virtual geometric shapes as a function of the corresponding size parameter for each virtual geometric shape; and
   (v) determining the energy application parameter based, at least in part, on the intersection area relationship;
   supplying a feedstock material to the addition location;
   delivering, from an energy source and to the addition location, an amount of energy sufficient to form a melt pool of the feedstock material at the addition location, wherein the amount of energy is based, at least in part, on the energy application parameter, wherein the delivering the amount of energy includes delivering along an axis of incidence, and further wherein the virtual geometric shape is a shell of rotation about the axis of incidence; and
   consolidating the melt pool with the previously formed portion of the manufactured component to form an additional portion of the manufactured component;
   wherein a rate of change of the intersection area relationship with respect to the size parameter is less than a threshold rate of change; and
   the method further includes determining that the addition location is proximate a gap within the previously formed portion of the manufactured component.

2. The method claim 1, wherein the intersection area relationship includes at least one of:
   (i) a plot of the area of intersection as the function of the size parameter;
   (ii) tabulated values of the area of intersection and corresponding values of the size parameter; and
   (iii) a functional relationship between the area of intersection and the size parameter.

3. The method of claim 1, wherein, for every size parameter of the virtual geometric shape, there is a corresponding area of intersection that quantifies a surface area of an outer surface of the virtual geometric shape that extends within the previously formed portion of the manufactured component.

4. The method of claim 1, wherein the virtual geometric shape has a constant shape.

5. The method of claim 1, wherein, for a given size parameter, the virtual geometric shape has a given virtual geometric shape volume that corresponds to the given size parameter.

6. The method of claim 1, wherein the virtual geometric shape is an at least partially spherical virtual geometric shape.

7. The method of claim 1, wherein the size parameter is indicative of at least one of:
   (i) a volume of the virtual geometric shape; and
   (ii) a surface area of the virtual geometric shape.

8. The method of claim 1, wherein the size parameter includes at least one of:
   (i) a radius of the virtual geometric shape;
   (ii) a diameter of the virtual geometric shape;
   iii) an effective radius of the virtual geometric shape; and
   (iv) an effective diameter of the virtual geometric shape.

9. The method of claim 1, wherein the determining includes:
   (i) determining, for a plurality of different size parameters of the virtual geometric shape, a corresponding plurality of areas of intersection between the previously formed portion of the manufactured component and the outer surface of the virtual geometric shape; and
   (ii) producing the intersection area relationship based, at least in part, on the plurality of different size parameters and the corresponding plurality of areas of intersection.

10. The method of claim 1, wherein the virtually positioning includes virtually positioning a centroid of the virtual geometric shape at the addition location.

11. The method of claim 9, wherein the producing the intersection area relationship includes at least one of:
   (i) producing a plot of the area of intersection as the function of the size parameter;
   (ii) producing tabulated values of the area of intersection and corresponding values of the size parameter;
   (iii) producing a functional relationship between the area of intersection and the size parameter;
   (iv) determining a slope of the area of intersection as the function of the size parameter;
   (v) determining an average slope of the area of intersection as the function of the size parameter;
   (vi) determining a minimum slope of the area of intersection as the function of the size parameter;
   (vii) determining the slope of the area of intersection as the function of the size parameter for a specific value of the size parameter; and
   (viii) determining the slope of the area of intersection as the function of the size parameter.

12. The method of claim 1, wherein, during the producing, the method further includes omitting, from the area of intersection, intersection of the outer surface of the virtual geometric shape with a region of the previously formed portion of the manufactured component that is not contiguous with a region of the previously formed portion of the manufactured component that includes the addition location.

13. The method of claim 1, wherein the method further includes decreasing the amount of energy when the rate of change of the intersection area relationship with respect to the size parameter is less than a threshold rate of change.

14. The method of claim 1, wherein the method further includes increasing the amount of energy when the rate of change of the intersection area relationship with respect to the size parameter is greater than a threshold rate of change.

15. The method of claim 1, wherein the method further includes changing the amount of energy proportionate to the rate of change of the intersection area relationship with respect to the size parameter.

16. The method of claim 1, wherein the determining the energy application parameter further includes determining the energy application parameter based, at least in part, on a rate of thermal energy dissipation at the addition location.

17. The method of claim 16, wherein the rate of thermal energy dissipation is within the previously formed portion of the manufactured component.

18. The method of claim 1, wherein the determining the energy application parameter further includes determining the energy application parameter based, at least in part, on an angle of incidence between the addition location and the amount of energy.

19. The method of claim 1, wherein the determining the energy application parameter further includes determining the energy application parameter based, at least in part, on an efficiency of absorption of the amount of energy by the previously formed portion of the manufactured component.

20. The method of claim 1, wherein the determining the energy application parameter further includes determining the energy application parameter based, at least in part, on a material property of the feedstock material.

* * * * *